United States Patent [19]

Kluger et al.

[11] Patent Number: 5,149,800
[45] Date of Patent: Sep. 22, 1992

[54] POLY(OXYALKYLENE) MODIFIED PHTHALOCYANINE COLORANTS

[75] Inventors: Edward W. Kluger, Pauline, S.C.; Max A. Weaver, Kingsport, Tenn.

[73] Assignee: Milliken Research Corporation, Spartanburg, S.C.

[21] Appl. No.: 371,477

[22] Filed: Jun. 26, 1989

[51] Int. Cl.$^5$ .................. C07D 209/56; C08K 5/3456
[52] U.S. Cl. .................................. 540/123; 540/131; 540/133; 540/135
[58] Field of Search ............... 540/123, 131, 133, 135, 540/124, 127; 524/88

[56] References Cited

U.S. PATENT DOCUMENTS

| | | | |
|---|---|---|---|
| 2,995,412 | 8/1961 | Klob et al. | 540/131 |
| 3,287,470 | 11/1966 | Pugin et al. | 540/133 |
| 4,284,729 | 8/1981 | Cross et al. | 521/158 |
| 4,347,173 | 8/1982 | Merian et al. | 524/88 |
| 4,634,553 | 1/1987 | Baxter et al. | 540/126 |
| 4,634,555 | 1/1987 | Baxter | 540/126 |
| 4,640,690 | 2/1987 | Baumgartner et al. | 8/506 |

FOREIGN PATENT DOCUMENTS 3264674  11/1988  Japan .................... 524/88

OTHER PUBLICATIONS

Solov'eva, Chemical Abs. vol. 96, 1982 Abstract 219256d.
Grant and Hacke's Chemical Dictionary [New York, 1987, McGraw-Hill], p. 14.
The Jeffamine Polyoxyalkyleneamines, Texaco Chemical Company, 4800 Fournace Place, P.O. Box 430, Bellaire, Tex. 77401, (Copyright 1984).

*Primary Examiner*—Robert T. Bond
*Assistant Examiner*—E. C. Ward
*Attorney, Agent, or Firm*—Timothy J. Monahan; H. William Petry

[57] ABSTRACT

A colorant for natural or synthetic resinous or polymeric materials, having the formula:

$$A-[D-Z-SO_2-N(R_2)-Y]_{1-16}$$

wherein; $R_2$ is selected from hydrogen, methyl, cyclohexyl, phenyl or Y; A is a nonionic metallophthalocyanine chromophore which can be substituted for example with halogen, alkyl, alkoxy, alkylthio, or aryloxy; Z is an arylene moiety; D is a linking group being or containing at least one of $-O-$, $-S-$, $-SO_2-$, $-N(R_3)-$, or $-N(SO_2R_4)-$ as the linking moiety, wherein $R_4$ is unsubstituted or substituted alkyl, cycloalkyl or aryl, and $R_3$ is $R_4$ or hydrogen; Y is a poly(oxyalkylene) moiety containing at least three monomeric units of the formula $(-RO-)$ wherein each R is straight or branched alkylene of 1–4 carbons or mixtures thereof, up to about 20 mole percent of said monomeric units may be connected by one or more linking groups such as alkyleneoxy, $-NH-$, or $-NHCONH-$, and wherein Y can be terminated by hydrogen, or by or contain as branch substituents, 1–3 groups or moieties selected from alkyl, cycloalkyl, acyl, or aryl; wherein any of the above recited hydrocarbon groups, moieties or substituents may themselves be substituted with up to four substituents selected, for example, from alkyl, halogen, mercapto, alkoxycarbonyl, hydroxy, alkoxy, or the like; and wherein each aliphatic hydrocarbon portion or moiety of the groups, moieties or substituents recited above contains from 1–20 carbons.

13 Claims, No Drawings

POLY(OXYALKYLENE) MODIFIED PHTHALOCYANINE COLORANTS

This invention new colorant compositions, their manufacture and uses, and particularly concerns such compositions for the tinting or deeper coloring of natural and synthetic polymeric or resinous materials or substrates, especially polyurethales and other thermosetting resins and polyolefins, wherein the chemical structures of the colorants are readily tailored to meet, in exceptional manner, the physical and chemical requirements of the specific industrial application.

Some of the desired physical and chemical characteristics of such colorants in addition to having at least substantial tinctorial power, include one or more of excellent clarity and light fastness, high heat stability, crystal structure and shade immutability, availability as liquids or at least good resin compatibility at processing temperatures for easy blending with the substrate, easy clean-up from processing, homogeneity of dispersal in the substrate, non-nucleating propensity of the colorant, and resistance to migration, settling, streaking, plating, subliming, blooming and the like of the colorant from the substrate.

Other desirable colorant properties and also other problems often encountered with the use of pigment material are discussed in U.S. Pat. No. 4,284,729 the disclosure of which is incorporated herein by reference. In that patent which is principally concerned with coloring thermosetting or cross-linkable resins, it is disclosed that conventional organic dyes can be modified with poly(oxyalkylene) constituents which carry reactive groups for entering the colorant into the polymer chain, e.g., by condensation. This technique is indicated as providing a mechanism whereby highly efficient (high tinctorial power) conventional organic dyes can readily be incorporated, chemically, into the resin molecule such that the dyes become essentially nonmigratory. Similarly, in U.S. Pat. No. 4,640,690 the disclosure of which is incorporated herein by reference, it is taught to color thermoplastic resins with compounds which contain conventional types of organic dyes such as azo, anthraquinone, triarylmethane and methine, linked directly to a poly(oxyalkylene) moiety through a nitrogen, oxygen or sulfur atom or a carboxyl group.

It is noted that in these patents the methods for associating the poly(oxyalkylene) moieties with the chromophore are specific to the reactants. For example, in the preparation of azo containing colorants an aromatic amine is reacted with an alkylene oxide under basic conditions. Similarly, where the poly(oxyalkylene) is attached directly to an anthraquinone nucleus the method comprises reacting a hydroxy substituted anthraquinone with an amino group on a poly(oxyalkylene). Neither of these nor similar methods are useful in the present invention.

It has been found moreover, that the use of such conventional organic dye moieties in thermosetting substrates limits the utility of the product in, e.g., high temperature applications for which the substrate material may actually have been designed. This results from the inherent instability of the conventional organic dye moiety at the higher use or processing temperatures of the product substrate.

Also noted here are the copper phthalocyanine (CuPc) compounds of U.S. Pat. No. 4,634,555 which are solids in contrast to the great majority of the compounds of the present invention. The liquid colorants are quite easily blended uniformly with a variety of thermoplastic or thermosetting resins. In contrast, the solid prior art CuPc compositions would need to be converted into fine particles and then blended in conventional equipment which necessarily is time consuming and operator intensive, and incurs homogeneity problems, substantial power requirements, and great difficulty in handling and equipment clean-up.

Objects, therefore, of the present invention are to provide colorants, the physical and chemical properties of which are readily modifiable to adapt them for blending or incorporation into various polymeric substrates, especially in thermosetting resin materials, wherein the colorants exhibit one or more of the aforementioned characteristics of substantial tinctorial power, light fastness excellent clarity, high heat stability, crystal structure and shade immutability, availability as liquids for easy blending with the substrate; to give essentially complete homogeneity of colorant, easy clean-up from processing, non-nucleating propensity, and resistance; to migration, settling, streaking, plating, subliming, blooming and the like of the colorant from the substrate; to provide compositions comprising polymeric substrates, especially polyurethane foams, tinted or deeper colored with the present colorants; and to provide a highly efficient and non-complex process for the manufacture of the present colorants.

These and other objects hereinafter becoming evident have been attained in accordance with the present invention in which the colorant has the formula:

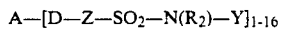

$$A-[D-Z-SO_2-N(R_2)-Y]_{1-16}$$

wherein; $R_2$ is selected from H or unsubstituted or substituted alkyl, cycloalkyl, aryl or Y; A is a nonionic metallophthalocyanine chromophore which can be substituted or unsubstituted; Z is a cyclic, unsaturated moiety hereinafter termed "arylene"; D is a linking group being or containing at least one of $-O-$, $-S-$, $-SO_2-$, $-N(R_3)-$, or $-N(SO_2R_4)-$ as the linking moiety, wherein $R_4$ is unsubstituted or substituted alkyl, cycloaliphatic or aryl, and $R_3$ is $R_4$ or hydrogen; Y is a poly(oxyalkylene) moiety comprised of at least about 50 mole percent of monomeric units or mixture thereof of the formula $(-RO-)$ wherein each R is substituted or unsubstituted straight or branched alkylene of 1-4 carbons or mixtures thereof; and wherein each aliphatic hydrocarbon portion or moiety of the groups, moieties or substituents recited above contains from 1-20 carbons.

In certain preferred embodiments:

(a) A is a nonionic metallophthalocyanine chromophore which can be substituted with 1-12 substitutents selected from halogen, alkyl, alkoxy, alkylthio, or aryloxy, or one to four $-SO_2N(R_2)-Y$; Y is a poly(oxyalkylene) moiety comprised of at least three monomeric units or mixture thereof of the formula $(-RO-)$ wherein, each R is straight or branched alkylene of 1-4 carbons or mixtures thereof, up to about 20 mole percent of said monomeric units may be connected by one or more linking groups selected from alkyleneoxy, aryleneoxy, alkylenedioxy, alkylenetrioxy, $-N(R_5)-$, or $-N(R_2)CON(R_2)-$, wherein each $R_5$ is selected from $R_2$ or $-SO_2-A$, and wherein Y can be terminated by hydrogen, or by or contain as branch substituents, 1-3 groups or moieties selected from alkyl, cycloalkyl, acyl, or aryl; wherein any of the above recited hydrocarbon groups, moieties or substituents may themselves be substituted, for example, may contain up to four substituents selected from alkyl, halogen, alkoxycarbonyl, hydroxy, alkoxy, alkylenedioxy, aryloxy, alkoxyalkyl, aryloxyalkyl, mercapto, alkylthio, arylthio, —N(R$_2$)CO(R$_2$)(R$_2$), —N(R$_2$)(R$_2$), —N(R$_2$)SO$_2$—A, —N(R$_2$)—acyl, —CON(R$_2$)(R$_2$), acyloxy or the like substituents which are known in the art; and wherein each aliphatic hydrocarbon portion or moiety of the groups, moieties or substituents recited above contains from 1-20, preferably 1-12 carbons.

(b) Y has an average molecular weight of from about 200 to about 1500;

(c) the chromophore A nucleus is unsubstituted;

(d) Y is terminated with a group selected from alkyl, aryl, acyl, alkoxyalkyl, mono- or dihydroxyalkyl, acyloxyalkyl, or a group of the formula:

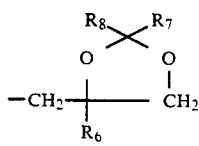

wherein each of R$_6$, R$_7$, and R$_8$ is selected from hydrogen, alkyl, or aryl;

(e) the total mole percentage of all —(RO)— unit linking groups relative to all said units in Y is from zero to about 20 percent;

(f) R2 is hydrogen or Y;

(g) R is —CH$_2$CH$_2$—, —CH(CH$_3$)CH$_2$—, —CH(C$_2$H$_5$)CH$_2$— or mixtures thereof;

(h) the chromophore is an unsubstituted phthalocyanine of Cu, Ni, or Al;

(i) the polymeric or resinous material composition contains from about 0.001 to about 10.0 weight percent of one or a mixture of any of the colorants as defined above;

(j) the material is thermoplastic;

(k) the material is polyurethane;

(l) —D—Z— is selected from —O—arylene—, —S—arylene—, —SO$_2$—arylene—, —N(R$_3$)—arylene—, —N(SO$_2$R$_4$)—arylene—, or —O—alkylene—O—arylene—;

(m) and the process for preparing the colorant comprises reacting at a temperature of e.g., from about 0° C. to about 100° C., metallophthalocyanine of the formula; A—(D—Z—SO$_2$X)$_{1-16}$ with at least a stoichiometric quantity of an amine of the formula; HN(R$_2$)Y wherein X is selected from Cl, F, Br, I, or alkoxy, and A, R$_2$, D, Z, and Y are as defined above. Preferred reaction media include water, alcohols or ethers containing acid acceptors such as alkali metal carbonates, hydroxide or tertiary amines. Other more specific and preferred process embodiments will hereinafter become evident.

With reference to the above general formula for the colorant, the phthalocyanine chromophore can be provided with one to sixteen —D—Z—SO$_2$X groups, each of which can be reacted with a reactive amine group HN(R$_2$)— which can be on the same or different ones of the poly(oxyalkylene) moieties Y. In this retard it is noted that where the Y moiety is large, steric hinderance is less likely to interfere with the reaction of multiple HN(R$_2$)— groups spaced thereon with multiple —SO$_2$X groups on the same phthalocyanine chromophore.

The arylene moiety Z includes mono- and multi cyclic hydrocarbon nuclei, unsubstituted or substituted, such as that of benzene, naphthalene, anthracene, and biphenyl, of various heterocyclic nuclei, unsubstituted or substituted, such as that of thiophene, benzothiazole, benzoxazole, furan, thiazole, thiadiazole, or quinoline, and various combinations of such hydrocarbon and heterocyclic nuclei. Specific ones of such Z moieties are given in the tables below.

The linking group D preferably is selected from —Q—, —Q—alkylene—, —Q—alkylene—Q—, —Q—arylene—, —Q—arylene—Q—, —Q—cycloalkylene—Q—, —Q—alkylene-cycloalkylene-alkylene—Q—, or —Q—alkylene-arylene-alkylene—Q—, wherein Q is selected from —O—, —S—, —SO$_2$—, —N(R$_3$)—, or —N(SO$_2$R$_4$)—.

Thermoplastic resins which may be used according to the present invention include a wide range of synthetic resins and synthetic resin compositions which are known in the art as being essentially thermoplastic in nature. The term "thermoplastic" is used herein in its conventional sense to mean a resin "having the property of softening or fusing when heated and of hardening again when cooled" (see Webster's Seventh Collegiate Dictionary, G & C Merriam Co., 1985). Thermoplastic resins are to be clearly distinguished both in terms of their essential physical and chemical characteristics from thermosetting resins. The term "thermosetting" used herein is also used in its conventional sense to means a resin "having the property of becoming permanently rigid when heated or cured".

Examples of thermoplastic resin systems which may be employed include a wide range of polyolefin polymers, e.g., polyethylene, linear low density polyethylene, polypropylene, polybutylene and copolymers made from ethylene, propylene and/or butylene. Other thermoplastic polymers which may be employed according to the present invention include polyvinyl chloride, polyvinylidene chloride, cellulosic resins such as cellulose acetate, cellulose acetate butyrate and cellulose acetate propionate, acrylic resins such as polymethyl methacrylate, styrene acrylonitrile, polystyrene, polycarbonate and acrylonitrile butadiene styrene (therein ABS). polyamides such as nylon 6 and nylon 66 and polyesters such as polyethylene terephthalate, especially glycol modified polyethylene terephthalate and polybutylene terephthalate.

As mentioned above, the colorants may be employed in the thermoplastic resins in a minor amount sufficient to provide the desired degree of coloration in the resin. The actual amount used will, in addition to the desired depth of shade, depend upon the tinctorial strength of the chromophore used and the overall molecular weight of the colorant, e.g., chromophore plus poly(oxyalkylene) chain length. Typically the amount of colorant employed may be from about 0.0001 percent to about 10 percent, preferably from about 0.001 percent to about 3 percent, and most preferably from about 0.1 to about 1.0 percent by weight based upon the overall weight of the resin composition.

Other conventional additives may also be present in the resin compositions of the present invention. For instance, such additives may include plasticizers, antioxidants, stabilizers, lubricants, flame retardants, nucleating agents and other additives which will be readily identified by those skilled in the art. In general, the colorants have been observed to have little or no adverse interactions with these conventional additives.

Because the colorants if used properly ordinarily do not detract from the clarity of the resin, it has been found that additives which improve the clarity of such resins may be particularly desirable for use in combination with colorants as described herein to provide resin products that are both colored and which also have excellent clarity. One particular class of additives which have been found to be useful in this regard are the benzylidene sorbitols including substituted benzylidene sorbitols such as those described in U.S. Pat. No. 4,016,118 to Hamada, et al. (E.C. Chemical); U.S. Pat. No. 4,371,645 to Mahaffey (Milliken Research Corporation); and Japanese Pat. No. SHO [1977] 53-17044 to Kobsyashi, et al.(New Japan Chemical); all of these patents being hereby incorporated herein by reference.

The particular shade of the colorant will depend primarily upon the particular chromophore group selected. A large variety of colors and shades may be obtained by blending two or more colorants. Blending the colorants of the present invention can be readily accomplished as the colorants are polymeric materials which may have substantially identical solubility characteristics, which are dictated by the nature of the polymeric chain. Therefore, the colorants are in general soluble in one another, and are also in general completely compatible with each other.

According to the process of the invention, the colorant may be incorporated into the thermoplastic resin using conventional techniques such as those employed to incorporate other additives in such resins. For instance, the colorant may be incorporated into the resin by simply adding it to the resin while the resin is in a plasticized or molten state, typically prior to formation of the polymer into its final shape, e.g., by molding, extrusion, blow-molding and the like. For instance when the thermoplastic resin to be colored is a polyolefin resin the process may be carried out by adding a colorant comprised of a poly(oxyalkylene) substituted chromophore group directly to the molten polymer, or by tumbling it onto a pre-extruded pelletized resin, or by mixing it into the resin powder prior to extrusion. The polymer may then be molded or extruded in the usual manner, i.e., in the same way as for polyolefin resins which are not colored. Details about these procedures may be found in the relevant literature.

Alternatively, a concentrate of the colorant in an appropriate resin or vehicle may first be prepared. Such concentrate may contain an appropriately high percentage of colorant. The concentrates may be in the form of liquids, solids, e.g., powders, pellets, etc., as may be desired. These concentrates may then be incorporated into the thermoplastic resin as is well understood in the art.

The colorants used in the process and in the composition of the present invention are polymeric colorants which may according to one embodiment be in the liquid phase. Thus, if in the liquid phase, they may be added to the thermoplastic polymer melt in solvent-free form rather than in the form of solutions or dispersions in a suitable solvent or dispersing medium. Obviously liquids may have certain processing advantages over solids, and moreover liquids may, if desired, be added directly to the molten polymer and therefore contain no extraneous solvent or dispersing agents. This process may, therefore, provide unusual and advantageous properties in the final thermoplastic resin product. Alternatively, however, the colorants may be premixed with minor amounts of a solvent or dispersing agent which is compatible with the resin, thus providing certain processing advantages.

According to the process of the invention, the liquid colorant may be incorporated into the thermosetting resins by simply adding it to the reaction mixture or to one of the components of the reaction mixture before or during the polyaddition reaction. For instance, when the thermosetting resin to be colored is a polyurethane resin the process may be carried out by adding the coloring agent in the form of a liquid to the polyol or even in some instances to the polyisocyanate component of the reaction mixture with before or during polyurethane formation. The subsequent reaction may be carried out in the usual manner, i.e., in the same way as for polyurethane resins which are not colored. Details about this procedure may be found in the relevant literature.

The present coloring agents of one embodiment of the present invention are polymeric, liquid, reactive coloring agents. Thus, they may be added to the reaction mixture or to one of the components thereof in solvent-free form rather than in the form of solutions or dispersions in suitable solvent or dispersing medium. Obviously liquids have significant processing advantages over solids, and moreover liquids of the present invention may, if desired, be added directly to the reaction mixture and therefore contain no extraneous nonreactive solvent or dispersing agent. This process may, therefore, provide unusual and advantageous properties in the final thermoset resin product. Alternatively, however, the coloring agent may be premixed with minor amounts of one or more of the precursors of the polymeric product, thus providing certain processing advantages.

The thermosetting resins to which the process of the present invention may be applied may be made by the reaction of a nucleophile with an electrophile. Examples of such resins include alkyds, allylics, the amines, e.g., melamine and urea, epoxies, phenolics, polyesters, silicones and urethanes. The thermosetting resin colored according to the present invention can be used in a variety of different end uses. e.g., as moldings, sealants, elastomers, films, fibers, lacquers, coating and foamed materials. It has been found in particular that the present colorants may quite advantageously be employed for the production of foams, such as polyurethane foams which may be soft, semi rigid or rigid foams, or the so-called polyurethane integral skin and microcellular foams. Such foams are useful for producing shaped products by injection molding, extrusion or calendaring and may be obtained by adding the liquid coloring agent to the polyol or diol component of the reaction mixture, or to one of the other components, although addition to the polyol component is preferred. The polyols may be polyesters which contain hydroxyl groups, in particular reaction products of dihydric alcohols and dibasic carboxylic acids, or polyethers which contain hydroxyl groups, in particular products of the addition of ethylene oxide, propylene oxide, styrene oxide or epichlorohydrin to water, alcohols or amines, preferably dialcohols. The colorant may also be admixed with chain extending diols, e.g., ethylene glycol, diethylene glycol and butane diol. In general, it is desirable not to use more than about 20 percent by weight of colorant based on the weight of polyol. In most cases very strong colorations are produced with a small proportion of the colorant, for example, from about 0.005 to about 2 percent, preferably 0.05 to 1 percent by weight colorant based on the weight of polyol.

Because the present colorants are, in themselves, polymeric compounds, they may be soluble, for instance, in most polyols which would be used in polyurethane manufacture, in most epoxy formulations, in polyester formulations and themselves in admixtures. This property may be particularly valuable in that this solubility may permit rapid mixing and homogeneous distribution throughout the resin, thus eliminating shading differences and streaks when properly mixed, the colorant may have no tendency to settle as would be the case with pigment dispersions, and it is possible to prepare a blend of two or more colorants which provides a wide range of color availability.

The present liquid reactive coloring agents may also be of considerable value in reaction injection molding (RIM) applications. The RIM process is a method of producing molded polyurethanes and other polymers wherein the two reactive streams are mixed while being poured into a mold. Upon reaction, the polymer is "blown" by chemicals to produce a foam structure. This process may be hindered by the presence of solid particles, such as conventional pigments. The present invention may not cause this hindrance because there are no particles in the system and the colorant becomes part of the polymer through reaction with one of the components.

General methods for preparing the colorants include the following two routes:

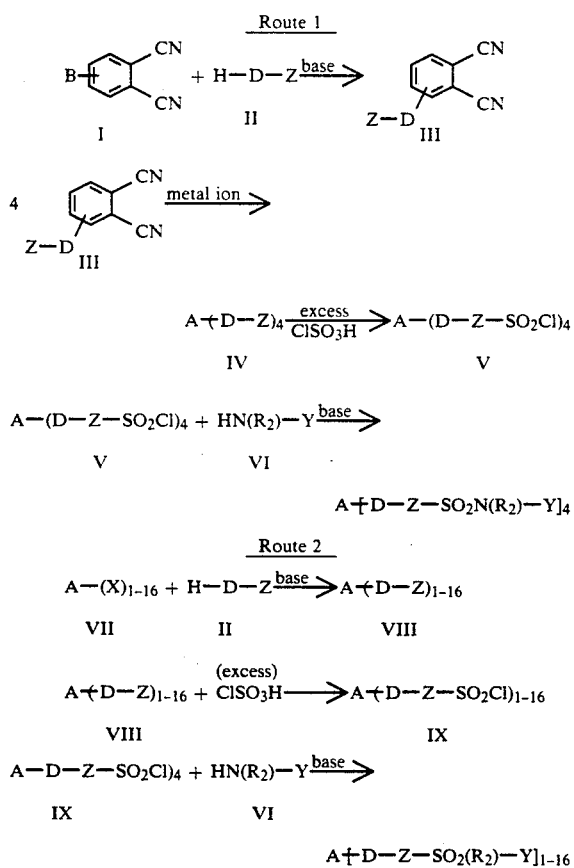

Route 1 involves the reaction of a phthalonitrile moiety containing a leaving group B(I), such as nitro or halogen, with a nucleophile(II). This reaction is preferably carried out in polar high-boiling solvents such as N,N-dimethylformamide and N-methyl-2-pyrrolidinone[A. W. Snow & J. R. Griffth, Marcomolecules, 17(1614-1624)]. Intermediates(III) are converted into metallophthalocyanines(IV) by known techniques using metals ions. Intermediates (IV) are then chlorosulfonated using excess chlorosulfonic acid at about 0°-30° C. to introduce chlorosulfonyl groups into the Z ring of (IV). If chlorosulfonation is desired also on the phthalocyanine ring itself, higher temperatures may be employed. Compounds (V) are then reacted with amines(VI) to give the desired phthalocyanine containing polyalkyleneoxy moiety Y.

Route 2 involves the reaction of a metallophthalocyanine containing 1-16 halogens(VII) with nucleophile(II) to give (VIII), a metallophthalocyanine moiety which contains 1 to 16 groups of the formula —D—Z [BASF, BP 1,537,375]. This nucleophilic displacement reaction is preferably carried out in at a high temperature in a polar high-boiling solvent such as N,N-dimethylformamide, N,N-dimethylacetamide, or N-methyl-2-pyrrolidinone. Chlorosulfonation at low temperature again gives compounds(V), which may contain a multiplicity of —D—Z—SO$_2$Cl groups. Compounds(V) are then reacted with amines(VI) to give the sulfonamide derivatives of the invention.

Obviously, many variations of the above reactions are possible. For example, in Route 1, intermediate(III) may be mixed with unsubstituted or substituted phthalonitriles containing a wide variety of substituents such as halogen, lower alkyl, lower alkoxy, alkylthio, arylthio, etc. and the mixture treated with metal ions to give metallophthalocyanines containing a wide variety of substituents. These intermediates may be chlorosulfonated and the corresponding sulfonyl chlorides reacted with amines(VI) to give highly substituted metallophthalocyanines containing the polyalkyleneoxy moiety Y.

Commercially available and preferred amines(VI) from which the present preferred colorants are prepared are the JEFFAMINE series described in Texaco Chemical Company, New Product Development brochures as the M, D, ED, DU, BUD, T, MNPA: and EDR series: the disclosures of which are incorporated herein by reference and copies of which are transmitted herewith.

The preferred amines(VI) finding special utility in the present Invention are as follows:

R$_9$—O(C$_2$H$_4$O)$_a$[CH$_2$CH(CH$_3$)O]$_b$CH$_2$CH(CH$_3$)NH$_2$
R$_9$—O(C$_2$H$_4$O)$_a$[CH$_2$CH(C$_2$H$_5$)O]$_b$CH$_2$CH(CH$_3$)NH$_2$
R$_9$—O(C$_2$H$_4$O)$_a$[CH$_2$CH(C$_2$H$_5$)O]$_b$CH$_2$CH(C$_2$H$_5$)NH$_2$
R$_9$—O(C$_2$H$_4$O)$_a$[CH$_2$CH(CH$_3$)O]$_b$CH$_2$CH(C$_2$H$_5$)NH$_2$
R$_9$—O[CH$_2$CH(CH$_3$)O]$_a$CH$_2$CH(CH$_3$)NH$_2$
R$_9$—O[CH$_2$CH(C$_2$H$_5$)O]$_a$CH$_2$CH(C$_2$H$_5$)NH$_2$
R$_9$—O[CH$_2$CH(C$_2$H$_5$)O]$_a$CH$_2$CH(CH$_3$)NH$_2$
R$_9$—O[CH$_2$CH(CH$_3$)O]$_a$CH$_2$CH(C$_2$H$_5$)NH$_2$
wherein a=1-19; b=2-31; and R$_9$ is selected from CH$_3$, C$_2$H$_5$, n—C$_3$H$_7$, n—C$_4$H$_9$, n—C$_5$H$_{11}$, or n—C$_6$H$_{13}$.

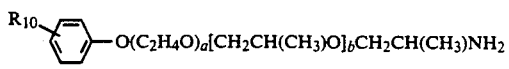

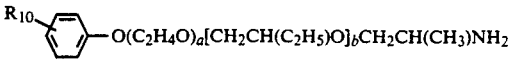

-continued
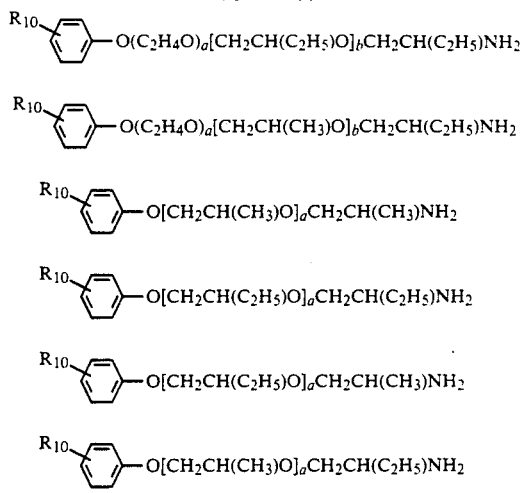
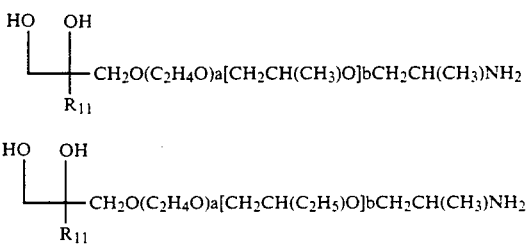
wherein a=1-19; b=2-31; and $R_{10}$ is selected from $CH_3$, $C_2H_5$, $C_4H_9$, $C_9H_{19}$, $OCH_3$, $OC_2H_5$, or $OC_4H_9$.
-continued
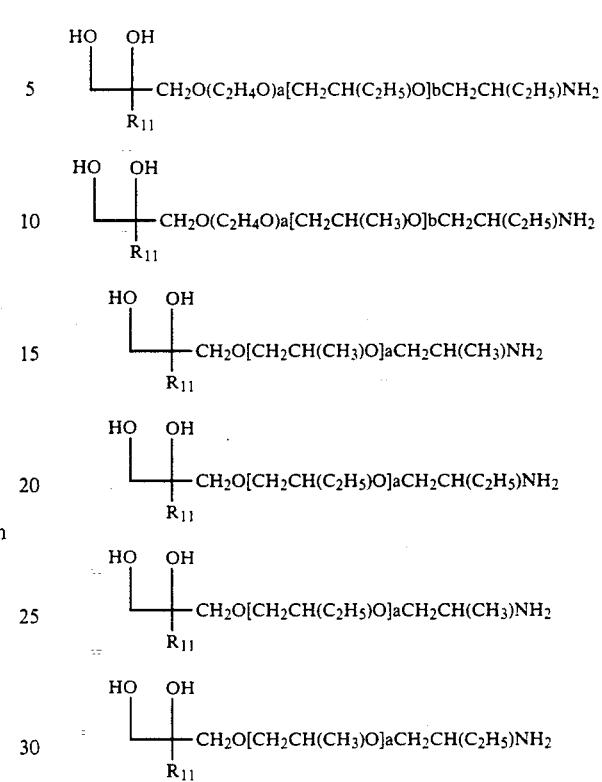
wherein a=1-19; b=2-31; and $R_{11}$ is selected from hydrogen, $CH_3$, or $C_2H_5$.
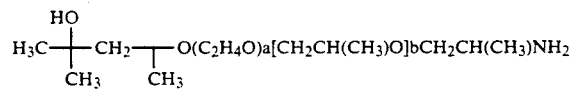
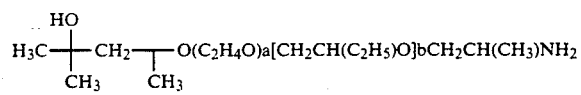
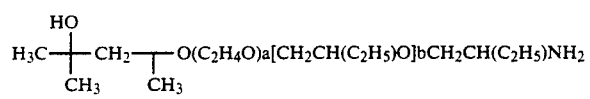
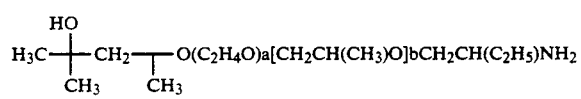
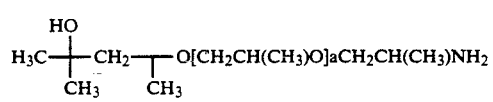
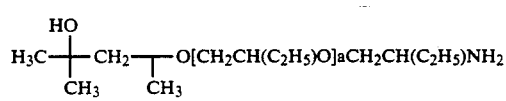
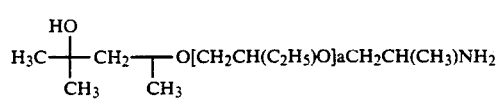

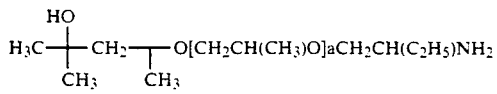

wherein a=1-19; b=2-31.

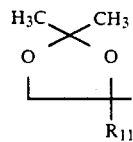

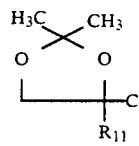

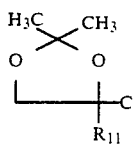

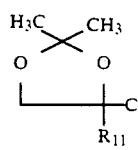

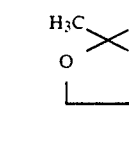

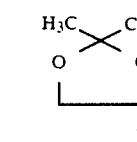

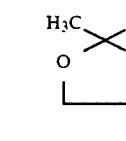

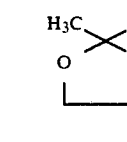

wherein a=1-19; b=2-31; and $R_{11}$ is recited above.

$H_2NCH(CH_3)CH_2[OCH(CH_3)CH_2]_a(OCH_2CH_2)_b[OCH_2CH(CH_3)]_cNH_2$ $H_2NCH(CH_3)CH_2[OCH(C_2H_5)CH_2]_a(OCH_2CH_2)_b[OCH_2CH(CH_3)]_cNH_2$ $H_2NCH(CH_3)CH_2[OCH(C_2H_5)CH_2]_a(OCH_2CH_2)_b[OCH_2CH(C_2H_5)]_cNH_2$ $H_2NCH(C_2H_5)CH_2[OCH(C_2H_5)CH_2]_a(OCH_2CH_2)_b[OCH_2CH(C_2H_5)]_cNH_2$ $H_2NCH(C_2H_5)CH_2[OCH(CH_3)CH_2]_a(OCH_2CH_2)_b[OCH_2CH(C_2H_5)]_cNH_2$ $H_2NCH(CH_3)CH_2[OCH(CH_3)CH_2]_aNH_2$ $H_2NCH(C_2H_5)CH_2[OCH(C_2H_5)CH_2]_aNH_2$ wherein b=4-132; and a+c=2-5.

$H_2N(CH_3)CHCH_2[OCH_2CH(CH_3)]_aHN-(CO)NH[CH(CH_3)CH_2O]_bCH_2CH(CH_3)NH_2$ $H_2N(C_2H_5)CHCH_2[OCH_2CH(C_2H_5)]_aHN-(CO)NH[CH(C_2H_5)CH_2O]_bCH_2CH(C_2H_5)NH_2$ $H_2N(CH_3)CHCH_2[OCH_2CH(C_2H_5)]_aHN-(CO)NH[CH(C_2H_5)CH_2O]_bCH_2CH(CH_3)NH_2$ $H_2N(C_2H_5)CHCH_2[OCH_2CH(CH_3)]_aHN-(CO)NH[CH(CH_3)CH_2O]_bCH_2CH(C_2H_5)NH_2$ wherein a=2-68 and b=2-68.

$HOCH(CH_3)CH_2NHCH(CH_3)CH_2[OCH_2CH(CH_3)]_aNHCH_2CH(CH_3)OH$ wherein a is 2.6.

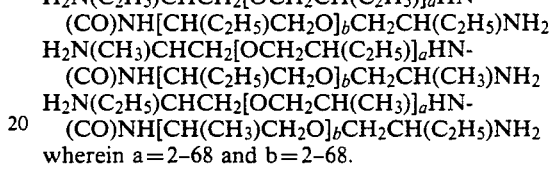

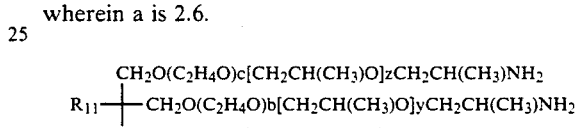

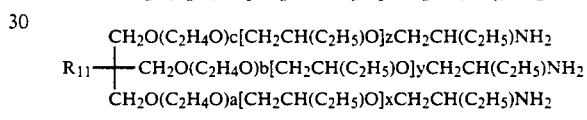

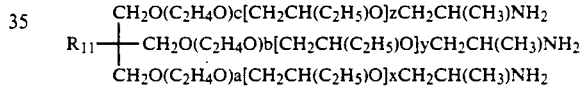

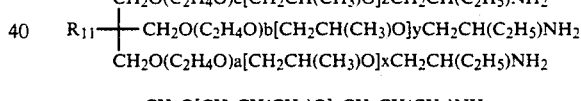

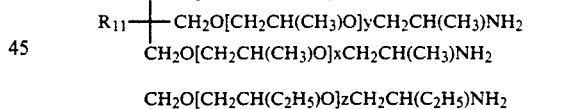

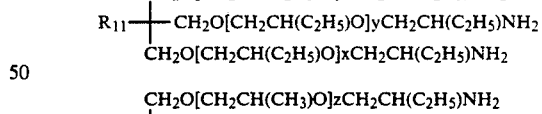

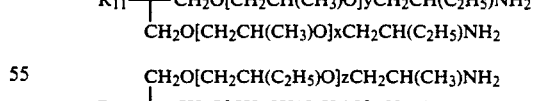

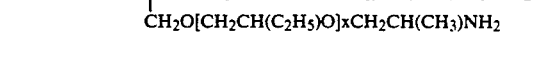

wherein a+b+c=1.80; and x+y+z=5-85; and $R_{11}$ is recited above.

The following examples illustrate preparation of the present colorants, parts and percentages, unless otherwise stated being by weight. The abbreviation EO, PO, and BO refer to —$CH_2CH_2$—, —$CH(CH_3)CH_2$—, and —$CH(C_2H_5)CH_2$—, respectively.

EXAMPLE #1

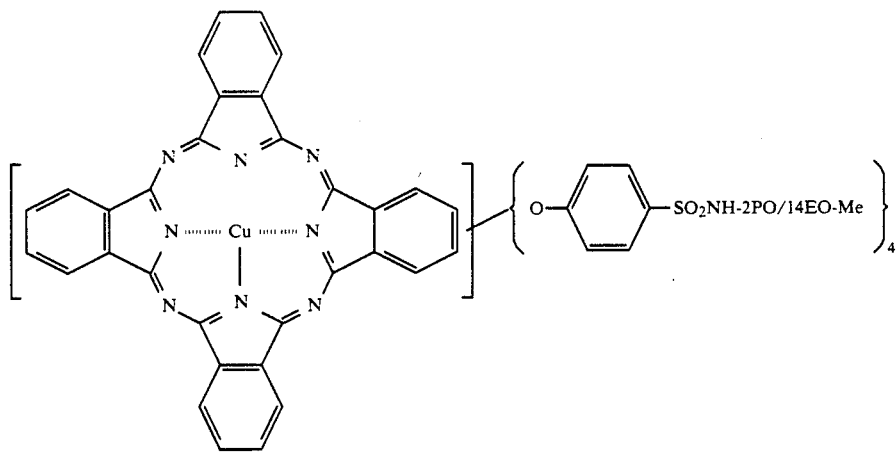

A mixture was prepared by adding 80.7 grams (0.11 mole) of a primary amine with an amine equivalent weight of 1.35 meq/g) to 25.7 grams sodium carbonate in 500 ml of water. The mixture was cooled to 10°–15° C. and 0.0242 mole of an aqueous wet cake of freshly prepared tetraphenoxy copper phthalocyanine sulfonyl chloride derivative (containing an average of about four chlorosulfonyl groups per molecule) was added to the mixture. After the addition was complete, the mixture was warmed to 50° C. for an additional two hours to insure complete reaction. Three hundred ml of methylene chloride was added followed by 300 ml of water. The methylene chloride solution was separated from the salt water solution, further washed several times with water to neutral pH, and dried over anhydrous magnesium sulfate. The dried solution was filtered and stripped under reduced pressure at 90° C. to give a blue liquid with maximum absorbance at 617 nm.

Sulfonation of Copper Tetraphenoxyphthalocyanine

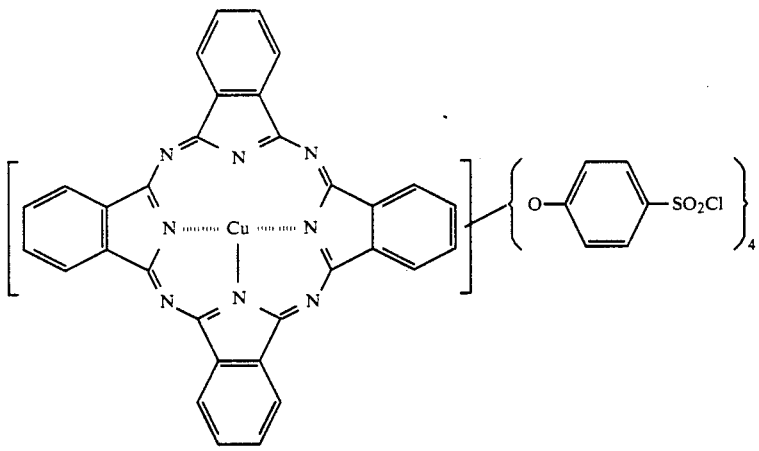

Thirty one grams (0.03 mole) of copper tetraphenoxyphthalocyanine were dissolved at less than 0° C. in 263 grams of chlorosulfuric acid. The cooling bath was removed and the solution was allowed to warm to room temperature over two hours. The solution was further heated to 30° C. for about two hours after which the heat was removed and the solution was allowed to stir overnight at room temperature. The solution was then poured very gradually into a stirred mixture of water and ice. The dull blue supsenion was filtered and washed with ice water several times.

Preparation of Copper Tetraphenoxyphthalocyanine

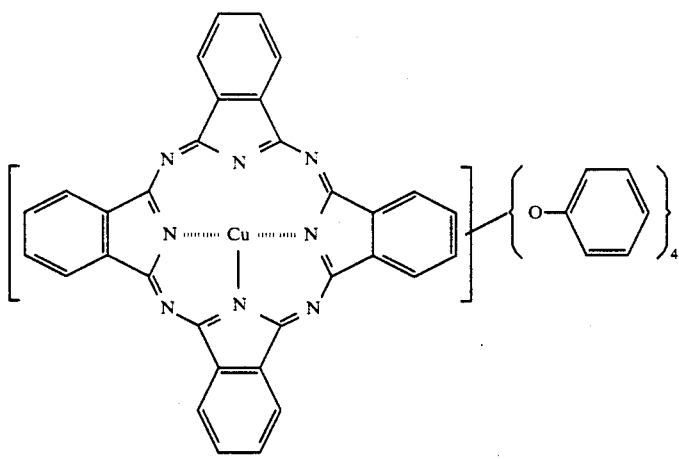

A mixture was prepared by adding of 147 grams (0.67 mole) of 4-phenoxyphthalonitrile, 16.6 grams (0.16 mole) of cuprous chloride to 2670 ml of Cellosolve. The mixture was heated at reflux. One hundred and two grams (0.67 mole) of DBU(1,8-diazabicyclo[5.4.0]-undec-7-ene were added to the reaction mixture. This mixture was then heated at reflux for about six hours. During this time the reaction proceeded and the mixture turned blue and a solid precipitated. The precipitate was collected by filtration, washed with 3 percent hydrochloric acid solution, water, then ethanol. The copper tetraphenoxypththalocyanine was obtained with a maximum absorbance at 680 nm.

Phenoxyphthalonitrile

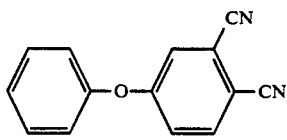

A mixture was prepared by adding 104 grams (1.1 moles) of phenol, 173 grams (1 mole) of 4-nitrophthalonitrile, and 207 grams of potassium carbonate in 1667 ml of dimethylformamide. The mixture was heated to 70° C. and mechanically stirred. Samples were taken of this reaction mixture periodically and analyzed by GLC. After five hours, the reaction was complete. The 4-phenoxyphthalonitrile was isolated by quenching the crude reaction mixture in ice water. The product was further purified by washing the crude precipitate with dilute sodium carbonate and then water. Finally the 4-phenoxyphthalonitrile was vacuum dried at 60° C.

EXAMPLE #2

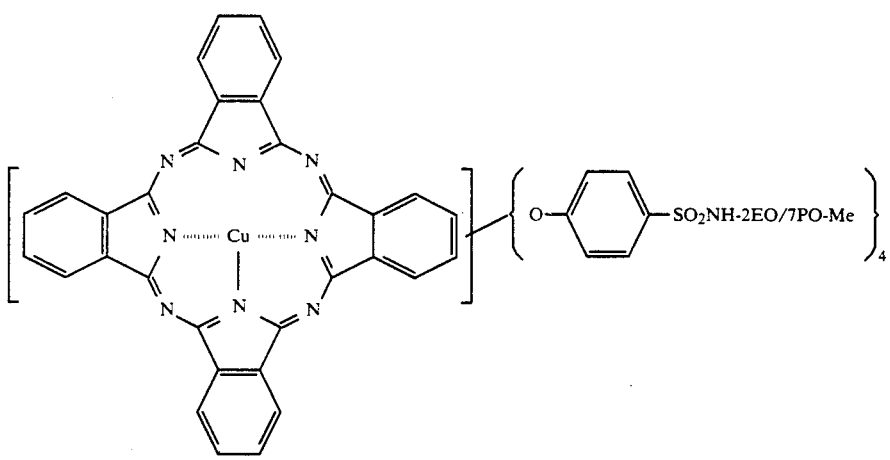

A mixture was prepared by adding 91.0 grams (0.19 mole) of a primary amine with an amine equivalent weight of 2.10 meq/g) to 44.5 grams sodium carbonate in 400 ml of THF and 200 ml of water. The mixture was cooled to 10°-15° C. and 0.042 mole of an aqueous wet cake of freshly prepared tetraphenoxy copper phthalocyanine sulfonyl chloride derivative (containing an average of about four chlorosulfonyl groups per molecule) was added to the mixture. After the addition was complete, the mixture was warmed to 50° C. for an additional two hours to insure complete reaction. Three hundred ml of methylene chloride was added followed by 300 ml of water. The methylene chloride solution was separated from the salt water solution, further washed several times with water to neutral pH, and dried over anhydrous magnesium sulfate. The dried solution was filtered and stripped under reduced pressure at 90° C. to give a blue liquid with maximum absorbance at 617 nm.

EXAMPLE #3

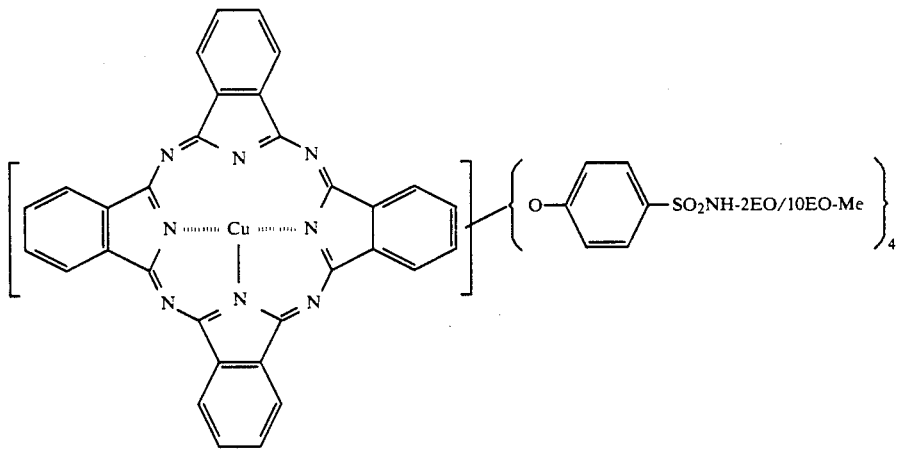

A mixture was prepared by adding 81.7 grams (0.14 mole) of a primary amine with an amine equivalent weight of 1.68 meq/g) to 33.0 grams sodium carbonate in 400 ml of THF and 200 ml of water. The mixture was cooled to 10°–15° C. and 0.031 mole of an aqueous wet cake of freshly prepared tetraphenoxy copper phthalocyanine sulfonyl chloride derivative (containing an average of about four chlorosulfonyl groups per molecule) was added to the mixture. After the addition was complete, the mixture was warmed to 50° C. for an additional two hours to insure complete reaction. Three hundred ml of methylene chloride was added followed by 300 ml of water. The methylene chloride solution was separated from the salt water solution, further washed several times with water to neutral pH, and dried over anhydrous magnesium sulfate. The dried solution was filtered and stripped under reduced pressure at 90° C. to give a blue liquid with maximum absorbance at 617 nm.

EXAMPLE #4

A mixture was prepared by adding 244.8 grams (0.41 mole) of Jeffamine M-600 primary amine with an amine equivalent weight of 1.66 meq/g) to 103.9 grams sodium carbonate in 1000 ml of water. The mixture was cooled to 10°–15° C. and 0.098 mole of an aqueous wet cake of freshly prepared tetraphenoxy copper phthalocyanine sulfonyl chloride derivative (containing an average of about four chlorosulfonyl groups per molecule) was added to the mixture. After the addition was complete, the mixture was warmed to 50° C. for an additional two hours to insure complete reaction. Three hundred ml of methylene chloride was added followed by 300 ml of water. The methylene chloride solution was separated from the salt water solution, further washed several times with water to neutral pH, and dried over anhydrous magnesium sulfate. The dried solution was filtered and stripped under reduced pressure at 90° C. to give a blue liquid with maximum absorbance at 617 nm.

EXAMPLE #5

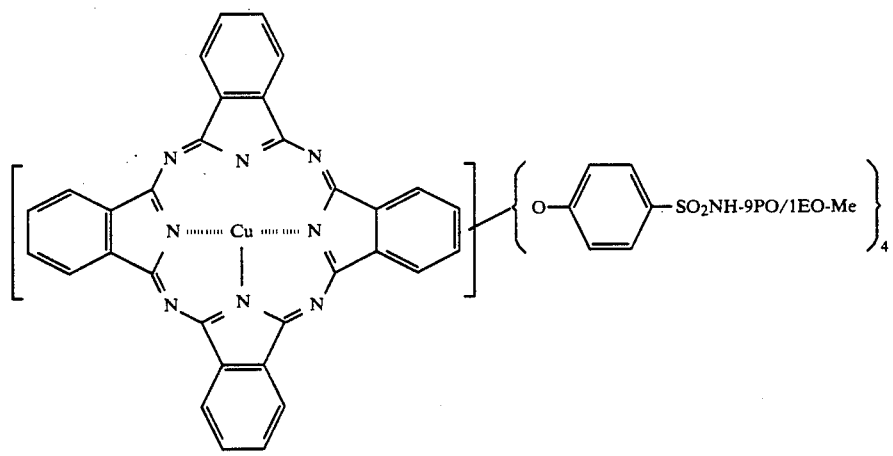

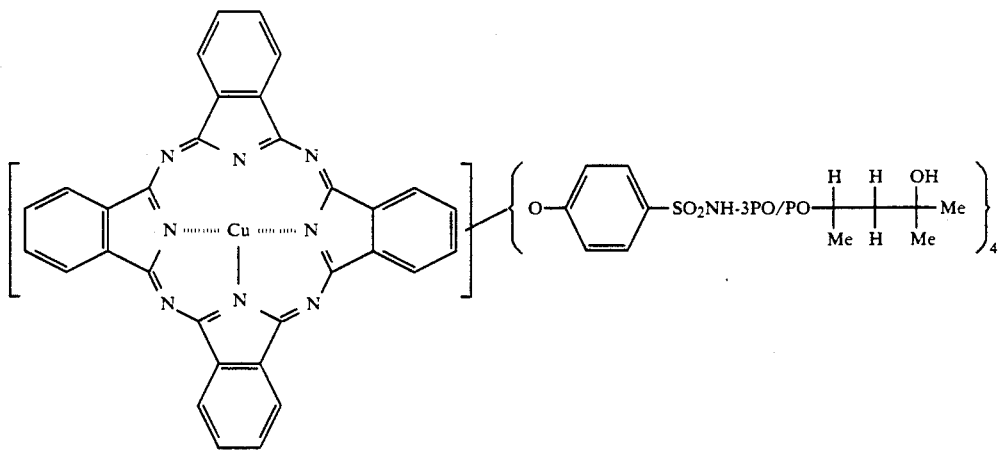

A mixture was prepared by adding 91.8 grams (0.20 mole) of a primary amine with an amine equivalent weight of 2.06 meq/g) to 33.4 grams sodium carbonate in 400 ml of THF. The mixture was cooled to 10°–15° C. and 0.0315 mole of an aqueous wet cake of freshly prepared tetraphenoxy copper phthalocyanine sulfonyl chloride derivative (containing an average of about four chlorosulfonyl groups per molecule) was added to the mixture. After the addition was complete, the mixture was warmed to 50° C. for an additional two hours to insure complete reaction. Three hundred ml of methylene chloride was added followed by 300 ml of water. The methylene chloride solution was separated from the salt water solution, further washed several times with water to neutral pH, and dried over anhydrous magnesium sulfate. The dried solution was filtered and stripped under reduced pressure at 90° C. to give a blue liquid with maximum absorbance at 617 nm.

EXAMPLE #6

A mixture was prepared by adding 241.4 grams (0.275 mole) of a primary amine with an amine equivalent weight of 2.70 meq/g) to 64.7 grams sodium carbonate in 400 ml of THF. The mixture was cooled to 10°–15° C. and 0.061 mole of an aqueous wet cake of freshly prepared tetraphenoxy copper phthalocyanine sulfonyl chloride derivative (containing an average of about four chlorosulfonyl groups per molecule) was added to the mixture. After the addition was complete, the mixture was warmed to 50° C. for an additional two hours to insure complete reaction. Three hundred ml of methylene chloride was added followed by 300 ml of water. The methylene chloride solution was separated from the salt water solution further washed several times with water to neutral pH, and dried over anhydrous magnesium sulfate. The dried solution was filtered and stripped under reduced pressure at 90° C. to give a blue liquid with maximum absorbance at 617 nm.

EXAMPLE #7

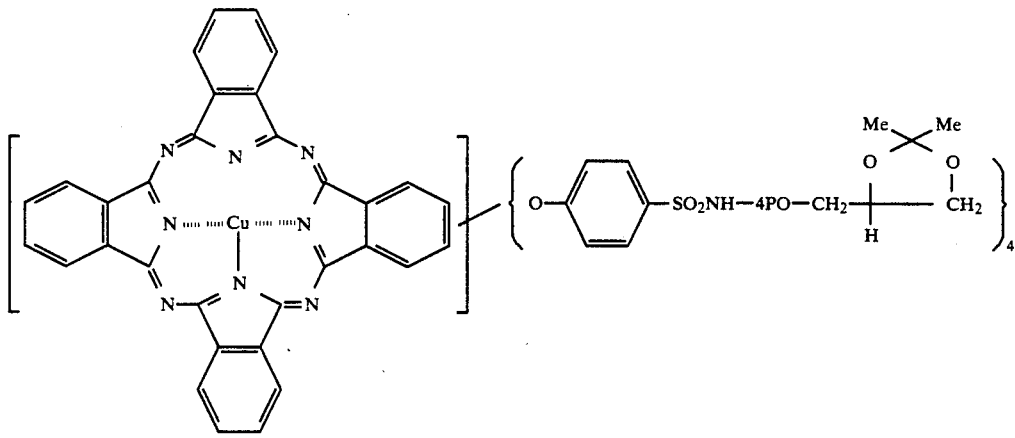

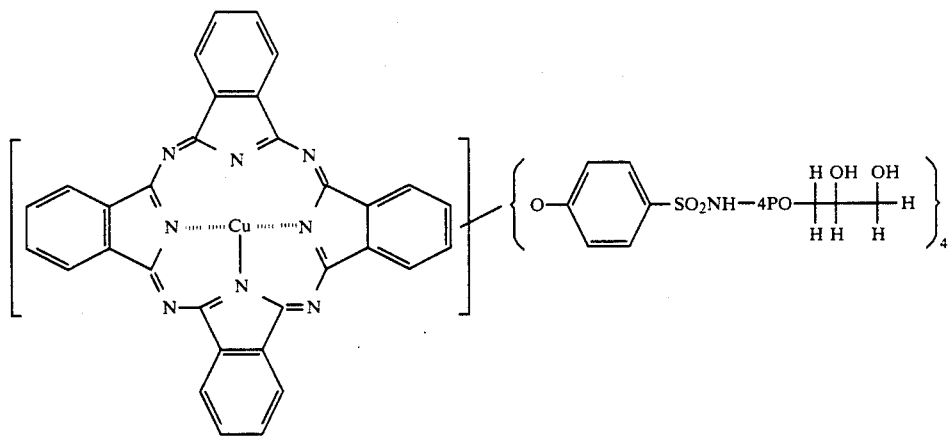

One hundred and fifty grams (0.061 mole) of the acetal prepared in example six were added along with 100 ml of water to a three necked 250 ml flask equipped with overhead stirrer, heating mantle, and Dean Stark trap. The mixture was heated to 80° C. and 4 grams of 70% sulfuric acid were added. This reaction mixture was maintained at 80° C. until no more acetone could be detected overhead in the trap. The mixture was then cooled and the product was extracted into methylene chloride. The methylene chloride solution was separated, washed several times with water to neutral pH, and dried over anhydrous magnesium sulfate. The dried methylene chloride solution was filtered and stripped under reduced pressure at 90° C. to give a blue product containing a hydroxyl band in the IR spectrum.

EXAMPLE #8 weight of 1.43 meq/g) to 36.2 grams sodium carbonate in 200 ml of THF. The mixture was cooled to 10°–15° C. and 0.0242 mole of an aqueous wet cake of freshly prepared tetraphenoxy nickel phthalocyanine sulfonyl chloride derivative (containing an average of about four chlorosulfonyl groups per molecule) was added to the mixture. After the addition was complete, the mixture was warmed to 50° C. for an additional two hours to insure complete reaction. Three hundred ml of methylene chloride was added followed by 300 ml of water. The methylene chloride solution was separated from the salt water solution, further washed several times with water to neutral pH, and dried over anhydrous magnesium sulfate. The dried solution was filtered and stripped under reduced pressure at 90° C. to give a blue liquid with maximum absorbance at 618 nm.

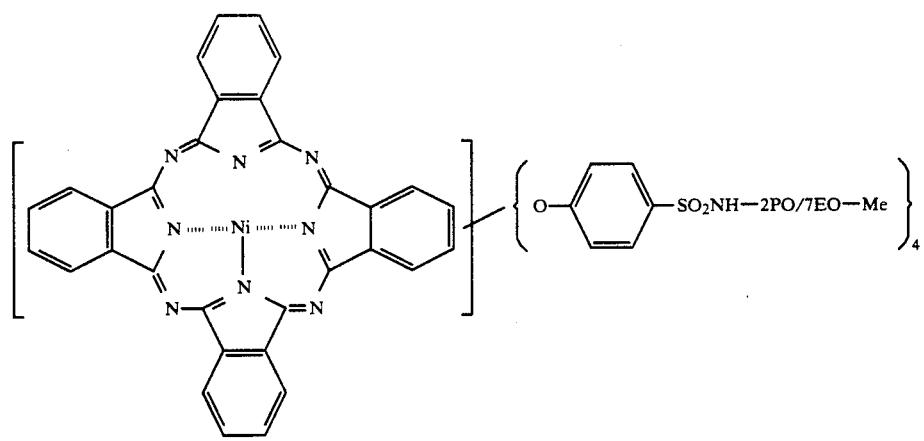

A mixture was prepared by adding 107.3 grams (0.16 mole) of a primary amine with an amine equivalent Sulfonation of Nickel Tetraphenoxyphthalocyanine

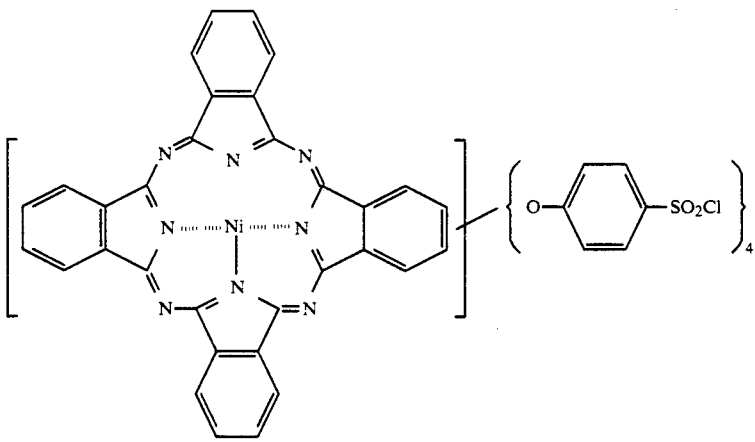

Thirty one grams (0.0344 mole) of nickel tetraphenoxyphthalocyanine were dissolved at less than 0° C. in 264 grams of chlorosulfuric acid. The cooling bath was removed and the solution was allowed to warm to room temperature over two hours. The solution was further heated to 30° C for about two hours after which the heat was removed and the solution was allowed to stir overnight at room temperature. The solution was then poured very gradually into a stirred mixture of water and ice. The dull blue supsenion was filtered and washed with ice water several times.

Preparation of Nickel Tetraphenoxyphthalocyanine

A mixture was prepared by adding of 44 grams (0.20 mole) of 4-phenoxyphthalonitrile, 12.4 grams (0.05 mole) of nickel(II) acetate tetrahydrate to 925 ml of Cellosolve. The mixture was heated at reflux collecting water in a Dean Stark trap. The trap was emptied of azeotrope several times to insure that water was removed and make-up Cellosolve solvent was added to keep the volume constant in the reaction vessel. Thirty one grams (0.20 mole) of DBU(1,8-diazabicyclo[5.4.0]-undec-7-ene were added to the reaction mixture. This mixture was then heated at reflux for about six hours. During this time the reaction proceeded and the mixture turned blue and a solid precipitated. The precipitate was collected by filtration, washed with 3 percent hydrochloric acid solution, water, then ethanol. A yield of 22.3 grams of nickel tetraphenoxypththalocyanine was obtained with maximum absorbance at 672 nm.

EXAMPLE #9

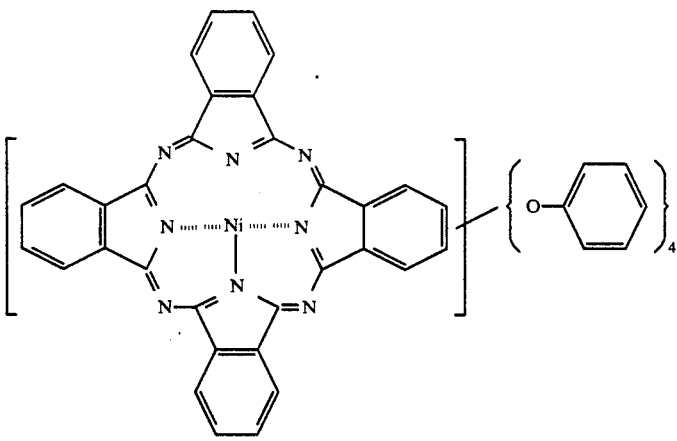

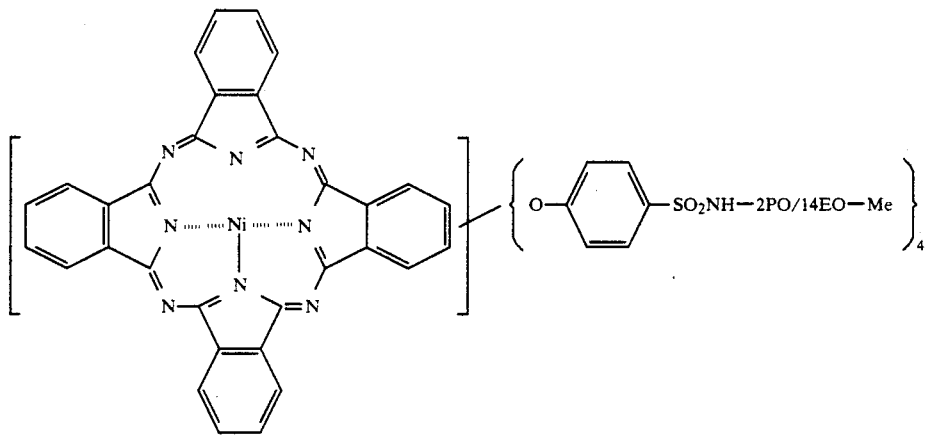

A mixture was prepared by adding 71.4 grams (0.10 mole) of a primary amine with an amine equivalent weight of 1.35 meq/g) to 23.5 grams sodium carbonate in 500 ml of water. The mixture was cooled to 10°–15° C. and 0.022 mole of an aqueous wet cake of freshly prepared tetraphenoxy nickel phthalocyanine sulfonyl chloride derivative (containing an average of about four chlorosulfonyl groups per molecule) was added to the mixture. After the addition was complete, the mixture was warmed to 50° C. for an additional two hours to insure complete reaction. Three hundred ml of methylene chloride was added followed by 300 ml of water. The methylene chloride solution was separated from the salt water solution, further washed several times with water to neutral pH, and dried over anhydrous magnesium sulfate. The dried solution was filtered and stripped under reduced pressure at 90° C. to give a blue liquid with maximum absorbance at 618 nm.

EXAMPLE #10

A mixture was prepared by adding 133.2 grams (0.18 mole) of a primary amine with an amine equivalent weight of 1.35 meq/g) to 42.4 grams sodium carbonate in 400 ml of THF. The mixture was cooled to 10°–15° C. and 0.040 mole of an aqueous wet cake of freshly prepared tetraphenoxy cobalt phthalocyanine sulfonyl chloride derivative (containing an average of about four chlorosulfonyl groups per molecule) was added to the mixture. After the addition was complete, the mixture was warmed to 50° C. for an additional two hours to insure complete reaction. Three hundred ml of methylene chloride was added followed by 300 ml of water. The methylene chloride solution was separated from the salt water solution, further washed several times with water to neutral pH, and dried over anhydrous magnesium sulfate. The dried solution was filtered and stripped under reduced pressure at 90° C. to give a blue colorant.

Sulfonation of Cobalt Tetraphenoxyphthalocyanine

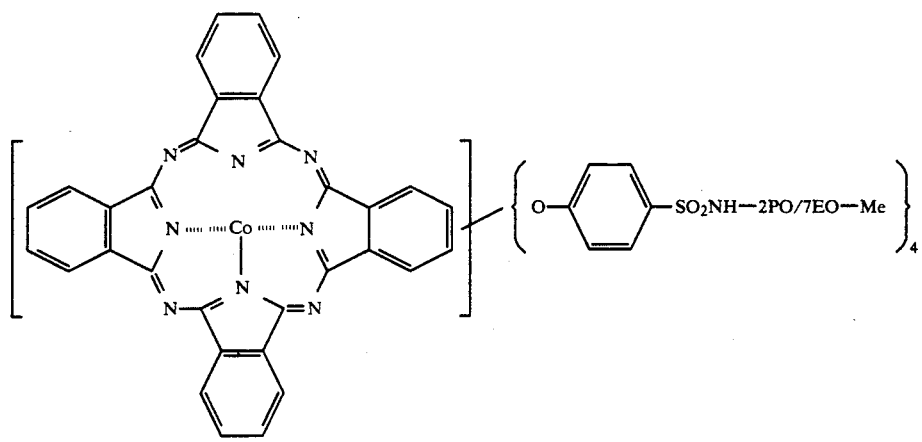

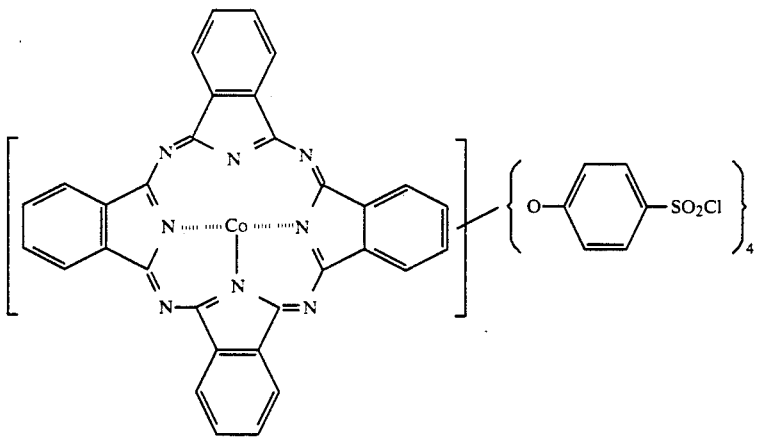

Thirty one grams (0.03 mole) of cobalt tetraphenoxyphthalocyanine were dissolved at less than 0° C. in 260 grams of chlorosulfuric acid. The cooling bath was removed and the solution was allowed to warm to room temperature over two hours. The solution was further heated to 30° C. for about two hours after which the heat was removed and the solution was allowed to stir overnight at room temperature. The solution was then poured very gradually into a stirred mixture of water and ice. The dull blue supsenion was filtered and washed with ice water several times.

Preparation of Cobalt Tetraphenoxyphthalocyanine

A mixture was prepare 147 grams 0.667 mole) of 4-phenoxyphthalonitrile, 20.8 grams (0.162 mole) of cobalt(II) chloride to 2632 ml of butyl Cellosolve. The mixture was heated at reflux. One hundred grams (0.667 mole) of DBU(1,8-diazabicyclo[5.4.0]-undec-7-ene were added to the reaction mixture. This mixture was then heated at reflux for about six hours. During this time the reaction proceeded and the mixture turned blue and a solid precipitated. The precipitate was collected by filtration, washed with 3 percent hydrochloric acid solution, water, then ethanol.

EXAMPLE #11

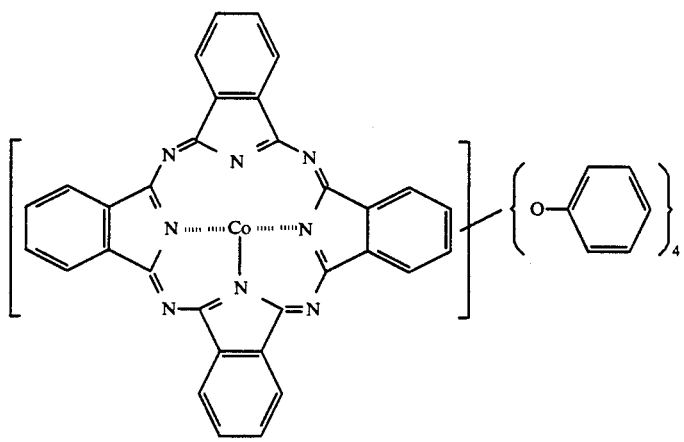

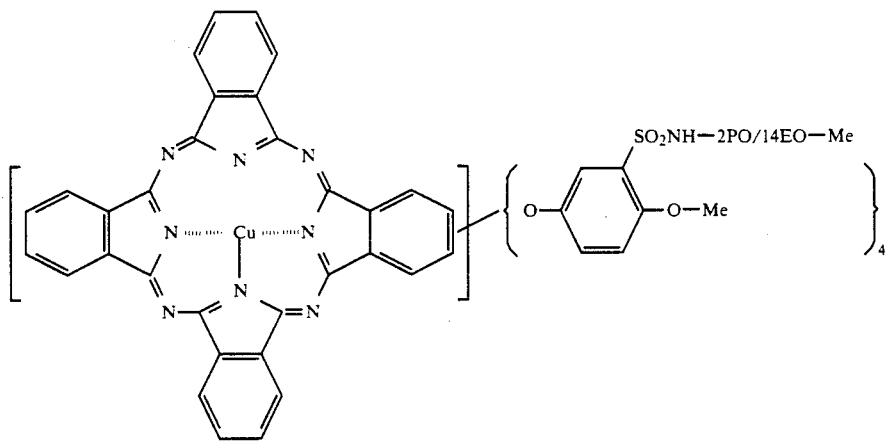

A mixture was prepared by adding 100.0 grams (0.135 mole) of a primary amine with an amine equivalent weight of 1.35 meq/g) to 31.8 grams sodium carbonate in 400 ml of water. The mixture was cooled to 10°–15° C. and 0.030 mole of an aqueous wet cake of freshly prepared tetra-p-methoxyphenoxy copper phthalocyanine sulfonyl chloride derivative (containing an average of about four chlorosulfonyl groups per molecule) was added to the mixture. After the addition was complete, the mixture was warmed to 50° C. for an additional two hours to insure complete reaction. Three hundred ml of methylene chloride was added followed by 300 ml of water. The methylene chloride solution was separated from the salt water solution, further washed several times with water to neutral pH, and dried over anhydrous magnesium sulfate. The dried solution was filtered and stripped under reduced pressure at 90° C. to give a blue liquid.

Sulfonation of Copper Tetra-p-methoxyphenoxyphthalocyanine

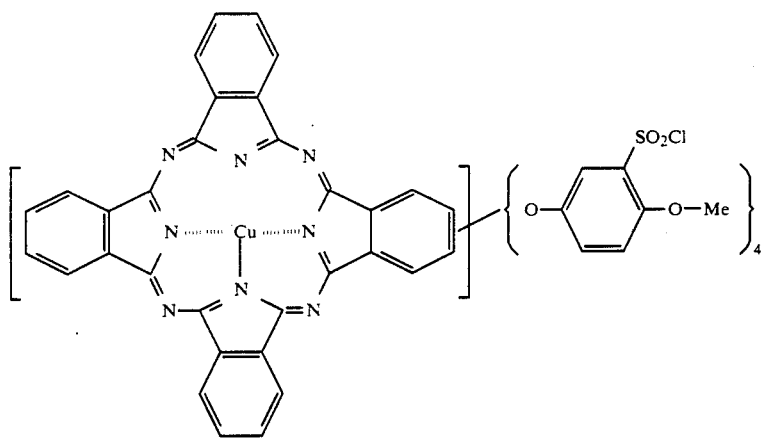

Thirty five grams (0.03 mole) of copper tetra-p-methoxyphenoxyphthalocyanine were dissolved at less than 0° C. in 263 grams of chlorosulfuric acid. The cooling bath was removed and the solution was allowed to warm to room temperature over two hours. The solution was further heated to 30° C. for about two hours after which the heat was removed and the solution was allowed to stir overnight at room temperature. The solution was then poured very gradually into a stirred mixture of water and ice. The dull blue suspension was filtered and washed with ice water several times.

Preparation of Copper
Tetra-p-methoxyphenoxyphthalocyanine

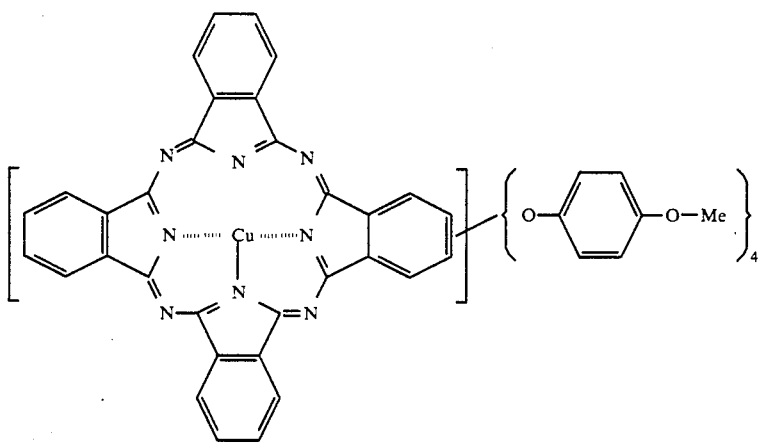

A mixture was prepare by adding of 164.5 grams (0.67 mole) of p-methoxyphenoxyphthalonitrile, 16.3 grams (0.166 mole) of cuprous chloride to 4000 ml of butyl Cellosolve. The mixture was heated at reflux. One hundred and two grams (0.67 mole) of DBU(1,8-diazabicyclo[5.4.0]-undec-7-ene were added to the reaction mixture. This mixture was then heated at reflux for about six hours. During this time the reaction proceeded and the mixture turned blue and a solid precipitated. The precipitate was collected by filtration, washed with 3 percent hydrochloric acid solution, water, then ethanol. The copper tetra-p-methoxyphenoxypthhalocyanine was obtained with maximum absorbance at 680 nm.

P-Methoxyphenoxyphthalonitrile

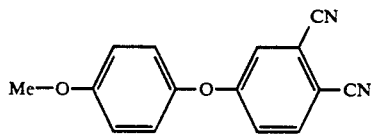

A mixture was prepared by adding 136.4 grams (1.1 moles) of p-methoxyphenol, 173 grams (1 mole) of 4-nitrophthalonitrile, and 207 grams of potassium carbonate in 1667 ml of dimethylformamide. The mixture was heated to 70° C. and mechanically stirred. Samples were taken of this reaction mixture periodically and analyzed by GLC. After five hours, the reaction was complete.

The p-methoxyphenoxyphthalonitrile was isolated by quenching the crude reaction mixture in ice water. The product was further purified by washing the crude precipitate with dilute sodium carbonate and then water. Finally the p-methoxyphenoxyphthalonitrile was vacuum dried at 60° C.

EXAMPLE #12

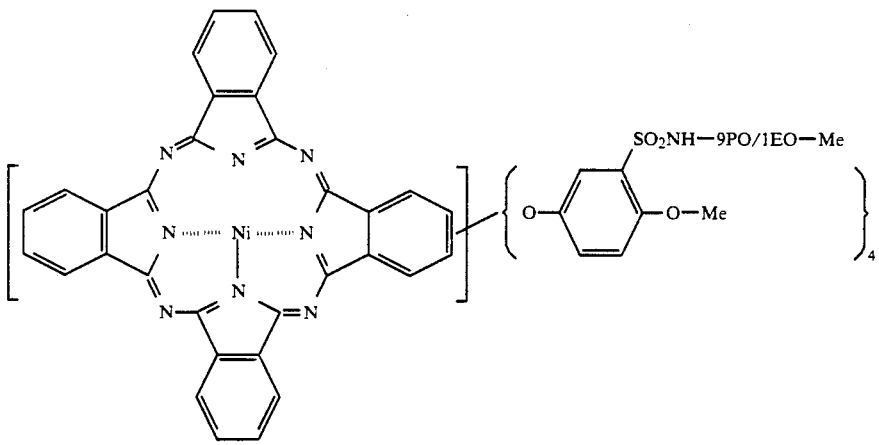

A mixture was prepared by adding 108.4 grams (0.18 mole) of Jeffamine M-600 primary amine with an amine equivalent weight of 1.66 meq/g) to 42.4 grams sodium carbonate in 400 ml of THF. The mixture was cooled to 10°–15° C. and 0.040 mole of an aqueous wet cake of freshly prepared tetra-p-methoxyphenoxy nickel phthalocyanine sulfonyl chloride derivative (containing an average of about four chlorosulfonyl groups per molecule) was added to the mixture. After the addition was complete, the mixture was warmed to 50° C. for an additional two hours to insure complete reaction. Three hundred ml of methylene chloride was added followed by 300 ml of water. The methylene chloride solution was separated from the salt water solution, further washed several times with water to neutral pH, and dried over anhydrous magnesium sulfate. The dried solution was filtered and stripped under reduced pressure at 90° C. to give a blue colorant.

EXAMPLE #13

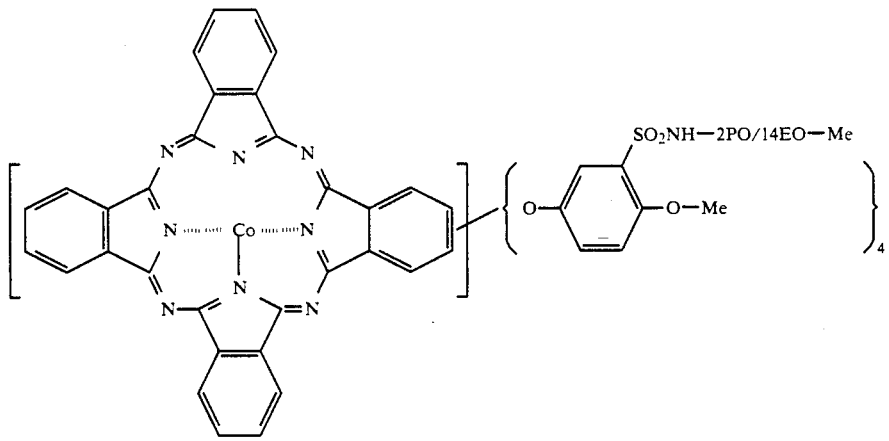

A mixture was prepared by adding 133.3 grams (0.18 mole) of a primary amine with an amine equivalent weight of 1.35 meq/g) to 42.4 grams sodium carbonate in 400 ml of THF. The mixture was cooled to 10°–15° C. and 0.040 mole of an aqueous wet cake of freshly prepared tetra-p-methoxyphenoxy cobalt phthalocyanine sulfonyl chloride derivative (containing an average of about four chlorosulfonyl groups per molecule) was added to the mixture. After the addition was complete, the mixture was warmed to 50° C. for an additional two hours to insure complete reaction. Three hundred ml of methylene chloride was added followed by 300 ml of water. The methylene chloride solution was separated from the salt water solution, further washed several times with water to neutral pH, and dried over anhydrous magnesium sulfate. The dried solution was filtered and stripped under reduced pressure at 90° C. to give a blue colorant.

EXAMPLE #14

A mixture was prepared by adding 226.7 grams (0.306 mole) of a primary amine with an amine equivalent weight of 1.35 meq/g) to 72.1 grams sodium carbonate in 400 ml of THF. The mixture was cooled to 10°–15° C. and 0.034 mole of an aqueous wet cake of freshly prepared tetraphenoxy copper phthalocyanine sulfonyl chloride derivative (containing an average of about eight chlorosulfonyl groups per molecule) was added to the mixture. After the addition was complete, the mixture was warmed to 50° C. for an additional two hours to insure complete reaction. Three hundred ml of methylene chloride was added followed by 300 ml of water. The methylene chloride solution was separated from the salt water solution, further washed several times with water to neutral pH, and dried over anhydrous magnesium sulfate. The dried solution was filtered and stripped under reduced pressure at 90° C. to give a blue colorant.

Sulfonation of Copper Tetraphenoxyphthalocyanine

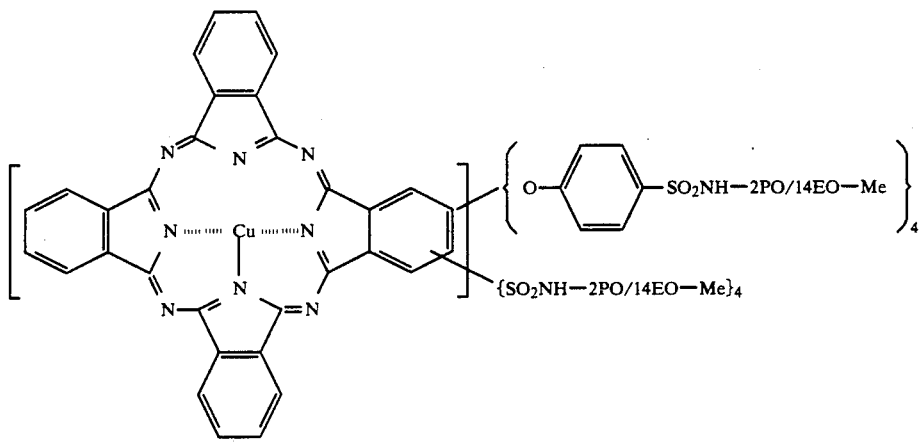

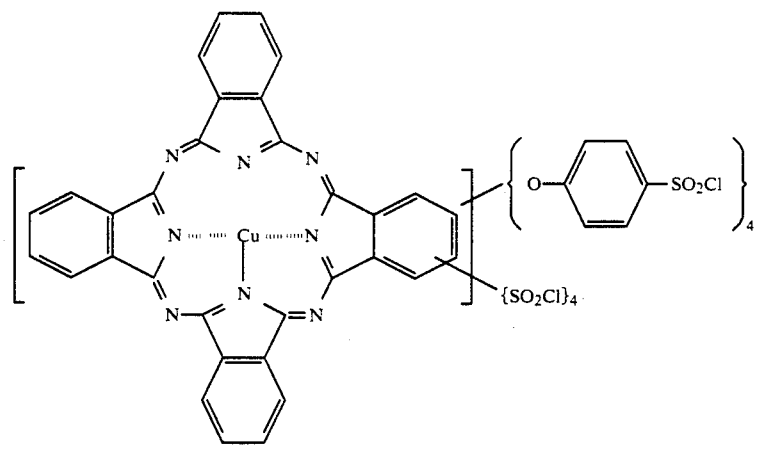

Thirty one grams (0.03 mole) of copper tetraphenoxyphthalocyanine are dissolved less than 0° C. in 400 grams of chlorosulfuric acid. The cooling bath was removed and the solution was allowed to warm to room temperature over two hours. The solution was further heated to 70° C. for about two hours then at 130° C. for eight hours. The heat was removed and the solution was allowed to stir overnight at room temperature. The solution was then poured very gradually into a stirred mixture of water and ice. The dull blue supsenion was filtered and washed with ice water several times.

EXAMPLE #15.

This example illustrates the use of polymeric phthalocyanine colorants in polyolefin systems. The following formations were preblended using a paddle type mixer and the colorant of example one:

| *INGREDIENT | |
|---|---|
| | Formulation 1 |
| 4MF Polypropylene resin (Exxon 9142G) | 99.47% |
| Irganox 1010 (Ciba-Geigy) | 800 ppm |
| Millad 3940 | 2500 ppm |
| Calcium stearate | 1000 ppm |
| Polymeric colorant (example #1) | 1000 ppm |
| | Formulation 2 |
| 4MF Polypropylene resin (Exxon 9142G) | 99.62% |
| Irganox 1010 (Ciba-Geigy) | 800 ppm |
| $TiO_2$ | 1000 ppm |
| Calcium stearate | 1000 ppm |
| Polymeric colorant (example #1) | 1000 ppm |

*Calcium stearate functions as a stabilizer; Irganox 1010 is a registered trademark of Ciba-Geigy Corporation for a hindered phenol stabilizer; Millard 3940 is a clarifier for polyolefins; $TiO_2$ is a white pigment which serves as an opacifier; 4MF Polypropylene resin (Exxon 9142G) is a random copolymer of propylene and ethylene.

After mixing, the formulations shown above melt compounded on a Brabender Twin Screw Mixer with a stock temperature of 245°-250° C. The compounded samples were then injection molded on a small toggle clamp machine into two-step plaques with thickness of 50 and 85 mils.

Formulation #1 had good clarity and was a deep cyan shade. Formulation #2 was opaque and had a medium cyan shade. Both formulations processed well in addition to having properties such as excellent heat stability, non-nucleation, non-migration and ease of resin clean up.

EXAMPLE #16

This example illustrates the use of polymeric phthalocyanine colorants in polyurethane. A polyurethane foam was prepared using the colorant of example seven in the formulation shown below:

| | |
|---|---|
| Niax 16-56 Polyol (Union Carbide Corp.) | 100 g |
| Water | 4.8 ml |
| Dabco 33 LV (Air Products) | 0.31 ml |
| T-9 Catalyst (MIT Chemical Co.) | 0.2 ml |
| L-520 Silicone (Union Carbide Corp.) | 1.5 ml |
| Methylene Chloride | 5.4 ml |
| Toluene Diisocyanate | 55 ml |
| Colorant (example #7) | 1 g |

This foam was cured for one hour at 160° F. to give an even, bright, aqua blue shade. The polymeric colorant was not extractable with methanol, indicating that the colorant had copolymerized into the polyurethane structure.

TABLE 1

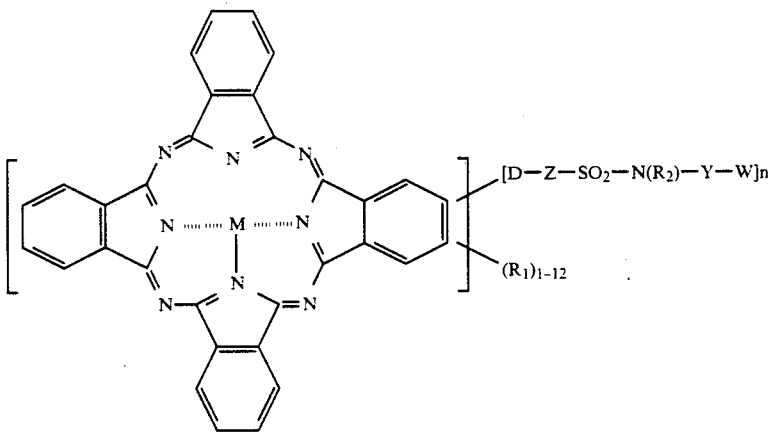

| Example | M | n | $(R_1)_{1-12}$ | —D—Z— | —N($R_2$)— | W | Y |
|---|---|---|---|---|---|---|---|
| 1 | Cu | 2 | tetra-Me | 4-OC$_6$H$_4$— | —NH— | Me | 2PO/7EO |
| 2 | Cu | 2 | H | -4-OC$_6$H$_4$— | —NH— | n-Bu | 6BO/6EO |
| 3 | Ni | 3 | H | -4-OC$_6$H$_4$— | —N(C$_2$H$_5$)— | Me | 2PO/10EO |
| 4 | Ni | 4 | tetra-Me | -4-OC$_6$H$_4$— | —NH— | n-Bu | 2BO/3EO |
| 5 | Al | 2 | H | -4-OC$_6$H$_4$— | —N(C$_6$H$_5$)— | Me | 4PO/3EO |
| 6 | Al | 4 | H | -4-OC$_6$H$_4$— | —NH— | n-Bu | 2BO/4EO |
| 7 | Cu | 1 | di-Cl | -3-OC$_6$H$_3$(4-OMe)— | —NH— | Me | 2PO/14EO |
| 8 | Cu | 2 | H | -3-OC$_6$H$_3$(4-OMe)— | —N(C$_6$H$_{11}$)— | Me | 4PO/3EO |
| 9 | Cu | 3 | tetra-Cl | -3-OC$_6$H$_3$(4-OMe)— | —NH— | Me | 9PO/1EO |
| 10 | Cu | 4 | H | -3-OC$_6$H$_3$(4-OMe)— | —NH— | Me | 2BO/6EO |
| 11 | Cu | 1 | tetra-Br | -5-OC$_6$H$_3$(2-OMe)— | —NH— | Me | 5PO/3EO |
| 12 | Al | 2 | H | -5-OC$_6$H$_3$(2-OMe)— | —N(CH$_2$C$_6$H$_5$)— | Me | 2PO/10EO |
| 13 | Cu | 4 | H | -5-OC$_6$H$_3$(2-OMe)— | —NH— | n-Bu | 2BO/3EO |
| 14 | Cu | 2 | H | -5-OC$_6$H$_3$(2-OMe)— | —NH— | Me | 4PO/3EO |
| 15 | Mn | 3 | tetra-I | -5-OC$_6$H$_3$(2-OMe)— | —N(Me)— | Me | 9PO/1EO |
| 16 | Cu | 4 | H | -5-OC$_6$H$_3$(2-OMe)— | —NH— | n-Bu | 3BO/6EO |
| 17 | Cu | 3 | H | -5-OC$_6$H$_3$(2-OMe)— | —N(n-C$_4$H$_9$)— | n-Bu | 2BO/3EO |
| 18 | Fe | 4 | H | -5-OC$_6$H$_3$(2-OMe)— | —NH— | n-Bu | 4BO/3EO |
| 19 | Cu | 1 | H | -4-OC$_6$H$_3$(3-OMe)— | —NH— | C$_6$H$_5$ | 2BO/6EO |
| 20 | Cu | 2 | tetra-OMe | -4-OC$_6$H$_3$(3-OMe)— | —NH— | Me | 4PO/3EO |
| 21 | Cu | 3 | H | -4-OC$_6$H$_3$(3-OMe)— | —N(CH$_3$)— | Me | 9PO/1EO |
| 22 | Cr | 4 | H | -4-OC$_6$H$_3$(3-OMe)— | —N(CH$_3$)— | Me | 2PO/7EO |
| 23 | Cu | 1 | di-OMe | -5-OC$_6$H$_2$(2,6-di-OMe)— | —N(CH$_3$)— | Me | 3BO/4EO |
| 24 | Cu | 2 | H | -5-OC$_6$H$_2$(2,6-di-OMe)— | —NH— | Me | 10 EO |
| 25 | Cu | 2 | H | -3-OC$_6$H$_3$(4-Me)— | —NH— | Me | 2PO/14EO |
| 26 | Cu | 2 | H | -3-OC$_6$H$_3$(4-Me)— | —NH— | Me | 4PO/3EO |
| 27 | Cu | 3 | di-Et | -3-OC$_6$H$_3$(4-Me)— | —NH— | Me | 2PO/8EO |
| 28 | Cr | 4 | H | -3-OC$_6$H$_3$(4-Me)— | —N(C$_2$H$_5$)— | Me | 2PO/7EO |
| 29 | Cu | 2 | H | -3-OC$_6$H$_3$(4-Me)— | —NH— | Me | 2PO/4EO |
| 30 | Cu | 4 | H | -3-OC$_6$H$_3$(4-Me)— | —NH— | Me | 12 EO |
| 31 | Cu | 1 | H | -5-OC$_6$H$_3$(2-Me)— | —NH— | n-Bu | 2BO/4EO |
| 32 | Cu | 2 | tetra-t-C$_4$H$_9$ | -5-OC$_6$H$_3$(2-Me)— | —NH— | Me | 2BO/6EO |
| 33 | Cu | 3 | H | -5-OC$_6$H$_3$(2-Me)— | —NH— | Me | 2PO/1EO |
| 34 | Cu | 4 | H | -5-OC$_6$H$_3$(2-Me)— | —N(CH$_3$)— | Me | 2PO/7EO |
| 35 | Cu | 2 | H | -5-OC$_6$H$_3$(2-Me)— | —NH— | Me | 2PO/4EO |
| 36 | Cu | 4 | H | -5-OC$_6$H$_3$(2-Me)— | —NH— | Me | 3BO/3EO |
| 37 | Cu | 1 | H | -4-OC$_6$H$_3$(3-Me)— | —NH— | Me | 2PO/6EO |
| 38 | Cu | 2 | di-Br | -4-OC$_6$H$_3$(3-Me)— | —NH— | Me | 2PO/10EO |
| 39 | Cu | 3 | H | -4-OC$_6$H$_3$(3-Me)— | —NH— | Me | 3PO/4EO |
| 40 | Cu | 4 | H | -4-OC$_6$H$_3$(3-Me)— | —NH— | Me | 8PO/2EO |
| 41 | Cu | 1 | H | -5-OC$_6$H$_2$(2,6-di-Me)— | —N(C$_6$H$_{11}$)— | Me | 3PO/6EO |
| 42 | Cu | 2 | H | -5-OC$_6$H$_2$(2,6-di-Me)— | —NH— | Me | 4PO/3EO |
| 43 | Cu | 2 | H | -3-OC$_6$H$_3$(4-OEt)— | —NH— | Me | 3BO/10EO |
| 44 | Cu | 2 | H | -3-OC$_6$H$_3$(4-Et)— | —NH— | n-Bu | 2BO/4EO |
| 45 | Cu | 3 | H | -3-OC$_6$H$_3$(4-OEt)— | —NH— | n-Bu | 8PO/8EO |
| 46 | Cu | 4 | H | -3-OC$_6$H$_3$(4-OEt)— | —NH— | Me | 2PO/6EO |
| 47 | Cu | 2 | di-OMe | -5-OC$_6$H$_3$(2-OEt)— | —NH— | Me | 2PO/8EO |
| 48 | Cu | 2 | H | -5-OC$_6$H$_3$(2-OEt)— | —NH— | Me | 4PO/3EO |
| 49 | Cu | 3 | H | -5-OC$_6$H$_3$(2-OEt)— | —NH— | n-Bu | 2BO/4EO |
| 50 | Cu | 4 | H | -5-OC$_6$H$_3$(2-OEt)— | —NH— | Me | 2PO/7EO |
| 51 | Cu | 3 | H | -5-OC$_6$H$_3$(2-OEt)— | —NH— | n-Bu | 8PO/8EO |
| 52 | Cu | 4 | H | -5-OC$_6$H$_3$(2-OEt)— | —NH— | Me | 2PO/5EO |
| 53 | Cu | 2 | di-I | -4-OC$_6$H$_3$(3-OEt)— | —NH— | C$_6$H$_5$ | 2PO/4EO |
| 54 | Cu | 2 | H | -4-OC$_6$H$_3$(3-OEt)— | —NH— | Me | 4PO/3EO |
| 55 | Cu | 3 | H | -4-OC$_6$H$_3$(3-OEt)— | —NH— | Me | 9PO/1EO |
| 56 | Cu | 4 | H | -4-OC$_6$H$_3$(3-OEt)— | —NH— | Me | 5PO/3EO |
| 57 | Cu | 2 | di-Cl | -3-OC$_6$H$_3$(4-t-Bu)— | —NH— | Me | 2PO/10EO |
| 58 | Cu | 2 | H | -3-OC$_6$H$_3$(4-t-Bu)— | —NH— | Me | 4PO/3EO |
| 59 | Cu | 3 | H | -3-OC$_6$H$_3$(4-t-Bu)— | —NH— | Me | 6PO/6EO |

TABLE 1-continued

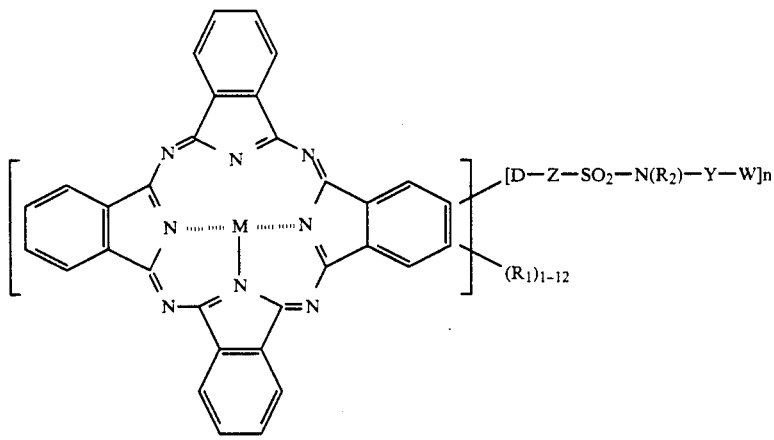

| Example | M | n | (R₁)₁₋₁₂ | —D—Z— | —N(R₂)— | W | Y |
|---------|---|---|----------|-------|---------|---|---|
| 60 | Cu | 4 | tetra-Cl | -3-OC₆H₃(4-t-Bu)— | —NH— | Me | 2PO/7EO |
| 61 | Cu | 2 | H | -3-OC₆H₃(4-t-Bu)— | —NH— | Me | 4PO/3EO |
| 62 | Cu | 4 | H | -3-OC₆H₃(4-t-Bu)— | —NH— | Me | 3PO/5EO |
| 63 | Cu | 2 | H | -3-OC₆H₃(4-Cl)— | —NH— | Me | 2PO/10EO |
| 64 | Cu | 2 | H | -3-OC₆H₃(4-Cl)— | —NH— | Me | 4PO/3EO |
| 65 | Cu | 3 | H | -3-OC₆H₃(4-Cl)— | —NH— | Me | 6PO/6EO |
| 66 | Cu | 4 | tetra-Et | -3-OC₆H₃(4-Cl)— | —NH— | Me | 2PO/7EO |
| 67 | Cu | 2 | H | -5-OC₆H₃(2-Cl)— | —NH— | Me | 4BO/4EO |
| 68 | Cu | 2 | H | -5-OC₆H₃(2-Cl)— | —NH— | Me | 4PO/3EO |
| 69 | Cu | 3 | H | -5-OC₆H₃(2-Cl)— | —NH— | Me | 3PO/3EO |
| 70 | Cu | 4 | tetra-Br | -5-OC₆H₃(2-Cl)— | —NH— | Me | 2PO/7EO |
| 71 | Cu | 2 | H | -3-OC₆H₃(4-Br)— | —NH— | Me | 2PO/31EO |
| 72 | Cu | 2 | H | -3-OC₆H₃(4-Br)— | —NH— | Me | 4PO/3EO |
| 73 | Cu | 3 | H | -3-OC₆H₃(4-Br)— | —NH— | Et | 9PO/1EO |
| 74 | Cu | 4 | H | -3-OC₆H₃(4-Br)— | —N(CH₃)— | Me | 2PO/7EO |
| 75 | Cu | 2 | H | -4-SC₆H₄— | —N(C₂H₅)— | Me | 6PO/3EO |
| 76 | Cu | 2 | tri-Cl | -4-SC₆H₄— | —N(CH₂C₆H₅)— | n-Bu | 6BO/6EO |
| 77 | Cu | 3 | H | -4-SC₆H₄— | —N(iso-C₃H₇)— | Me | 2PO/10EO |
| 78 | Cu | 4 | H | -4-SC₆H₄— | —N[(6EO)—C₆H₁₃]— | n-Bu | 2BO/3EO |
| 79 | Cu | 2 | H | -4-SC₆H₄— | —N[(2EO/3PO)—Me]— | Me | 2PO/4EO |
| 80 | Cu | 4 | H | -4-SC₆H₄— | —N[(4EO)—C₆H₁₃]— | Me | 2PO/6EO |
| 81 | Cu | 2 | H | -3-SC₆H₃(4-OMe)— | —N(CH₂C₆H₁₃)— | n-Bu | 8PO/8EO |
| 82 | Cu | 2 | tetra-OEt | -3-SC₆H₃(4-OMe)— | —N(iso-C₄H₉)— | Me | 4PO/3EO |
| 83 | Cu | 3 | H | -3-SC₆H₃(4-OMe)— | —N(C₆H₁₁)— | Me | 9PO/1EO |
| 84 | Cu | 4 | H | -3-SC₆H₃(4-OMe)— | —N(C₆H₅)— | Me | 2PO/7EO |
| 85 | Cu | 2 | di-OEt | -3-SC₆H₃(4-Me)— | —N(C₂H₄OH)— | Me | 5PO/5EO |
| 86 | Cu | 2 | H | -3-SC₆H₃(4-Me)— | —NH— | Me | 4PO/3EO |
| 87 | Cu | 3 | H | -3-SC₆H₃(4-Me)— | —NH— | Me | 3BO/2EO |
| 88 | Cu | 4 | H | -3-SC₆H₃(4-Me)— | —NH— | Me | 2PO/5EO |
| 89 | Cu | 4 | H | -3-SC₆H₃(4-Me)— | —NH— | n-Bu | 2BO/4EO |
| 90 | Cu | 4 | H | -[3-SC₆H₃(4-Me)— | —NH— | n-Bu | 3BO/2EO |
| 91 | Cu | 2 | tri-Cl | -3-SC₆H₃(4-Cl)— | —NH— | Me | 2PO/16EO |
| 92 | Cu | 2 | H | -3-SC₆H₃(4-Cl)— | —NH— | Me | 4PO/3EO |
| 93 | Cu | 2 | H | -3-SC₆H₃(4-Cl)— | —N(CH₃)— | Me | 4PO/2EO |
| 94 | Cu | 2 | H | -3-SC₆H₃(4-Cl)— | —N(CH₃)— | Me | 2PO/7EO |
| 95 | Ni | 2 | H | -4-OC₆H₄— | —NH— | Me | 2PO/7EO |
| 96 | Ni | 2 | H | -4-OC₆H₄— | —NH— | n-Bu | 6BO/6EO |
| 97 | Ni | 3 | H | -4-OC₆H₄— | —NH— | Me | 2PO/10EO |
| 98 | Ni | 4 | H | -4-OC₆H₄— | —NH— | n-Bu | 2BO/3EO |
| 99 | Ni | 2 | H | -4-OC₆H₄— | —NH— | Me | 4PO/3EO |
| 100 | Ni | 4 | H | -4-OC₆H₄— | —NH— | n-Bu | 2BO/4EO |
| 101 | Ni | 1 | tri-Br | -3-OC₆H₃(4-OMe)— | —NH— | Me | 2PO/14EO |
| 102 | Ni | 2 | H | -3-OC₆H₃(4-OMe)— | —NH— | Me | 4PO/3EO |
| 103 | Ni | 2 | H | -5-OC₆H₃(2-OMe)— | —N(CH₂C₆H₅)— | Me | 5PO/3EO |
| 104 | Ni | 2 | di-OEt | -5-OC₆H₃(2-OMe)— | —N(C₂H₅)— | Me | 2PO/10EO |
| 105 | Ni | 4 | H | -5-OC₆H₃(2-OMe)— | —NH— | n-Bu | 2BO/3EO |
| 106 | Ni | 2 | H | -3-OC₆H₃(4-Me)— | —NH— | Me | 2PO/14EO |
| 107 | Ni | 2 | H | -3-OC₆H₃(4-Me)— | —NH— | Me | 4PO/3EO |
| 108 | Ni | 4 | H | -3-OC₆H₃(4-Me)— | —NH— | Me | 2PO/7EO |
| 109 | Ni | 2 | H | -3-OC₆H₃(4-Me)— | —NH— | Me | 2PO/4EO |
| 110 | Ni | 4 | H | -3-OC₆H₃(4-Me)— | —NH— | Me | 12 EO |
| 111 | Ni | 2 | tetra-Me | -5-OC₆H₃(2-Me)— | —NH— | n-Bu | 2BO/4EO |
| 112 | Ni | 2 | di-OMe | -5-OC₆H₃(2-Me)— | —NH— | Me | 2BO/6EO |
| 113 | Ni | 4 | H | -5-OC₆H₃(2-Me)— | —NH— | Me | 2PO/4EO |
| 114 | Ni | 4 | H | -5-OC₆H₃(2-Me)— | —NH— | Me | 3BO/3EO |
| 115 | Ni | 4 | H | -5-OC₆H₂(2,6-di-Me)— | —NH— | Me | 3PO/6EO |
| 116 | Ni | 2 | H | -5-OC₆H₂(2,6-di-Me)— | —NH— | Me | 4PO/3EO |
| 117 | Ni | 2 | di-I | -3-OC₆H₃(4-OEt)— | —NH— | Me | 3BO/10EO |
| 118 | Ni | 2 | H | -5-OC₆H₃(2-OEt)— | —N(CH₃)— | Me | 2PO/8EO |

TABLE 1-continued

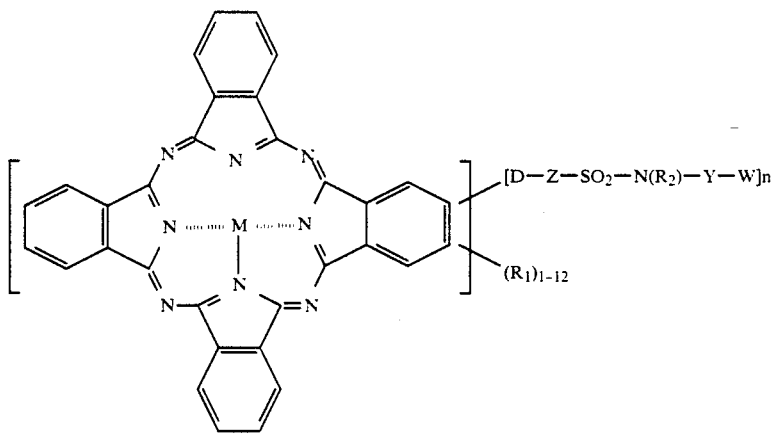

| Example | M | n | (R₁)₁₋₁₂ | —D—Z— | —N(R₂)— | W | Y |
|---|---|---|---|---|---|---|---|
| 119 | Ni | 4 | H | -5-OC₆H₃(2-OEt)— | —N(CH₃)— | Me | 4PO/3EO |
| 120 | Ni | 2 | H | -3-OC₆H₃(4-t-Bu)— | —NH— | Me | 2PO/10EO |
| 121 | Ni | 4 | H | -3-OC₆H₃(4-t-Bu)— | —NH— | Me | 4PO/3EO |
| 122 | Ni | 2 | di-Cl | -3-OC₆H₃(4-t-Bu)— | —NH— | Me | 2PO/7EO |
| 123 | Ni | 4 | tetra-OEt | -3-OC₆H₃(4-t-Bu)— | —NH— | Me | 4PO/3EO |
| 124 | Ni | 4 | H | -3-OC₆H₃(4-t-Bu)— | —NH— | Me | 3PO/5EO |
| 125 | Ni | 2 | H | -3-OC₆H₃(4-Cl)— | —NH— | Me | 2PO/10EO |
| 126 | Ni | 2 | H | -3-OC₆H₃(4-Cl)— | —N(iso-C₃H₇OH)— | Me | 4PO/3EO |
| 127 | Ni | 4 | H | -3-OC₆H₃(4-Br)— | —N(C₂H₄OH)— | Me | 2PO/7EO |
| 128 | Ni | 2 | di-Br | -4-SC₆H₄— | —NH— | Me | 6PO/3EO |
| 129 | Ni | 2 | H | -4-SC₆H₄— | —NH— | n-Bu | 6BO/6EO |
| 130 | Ni | 3 | H | -4-SC₆H₄— | —NH— | Me | 2PO/10EO |
| 131 | Ni | 4 | H | -4-SC₆H₄— | —N(2EO)— | n-Bu | 2BO/3EO |
| 132 | Ni | 2 | H | -4-SC₆H₄— | —NH— | Me | 2PO/4EO |
| 133 | Ni | 4 | H | -4-SC₆H₄— | —NH— | Me | 2PO/6EO |
| 134 | Ni | 2 | di-Me | -3-SC₆H₃(4-Me)— | —NH— | Me | 5PO/5EO |
| 135 | Ni | 2 | H | -3-SC₆H₃(4-Me)— | —N(CH₃)— | Me | 4PO/3EO |
| 136 | Ni | 3 | H | -3-SC₆H₃(4-Me)— | —N(CH₃)— | Me | 3BO/2EO |
| 137 | Ni | 4 | H | -3-SC₆H₃(4-Me)— | —NH— | Me | 2PO/5EO |
| 138 | Ni | 2 | H | -3-SC₆H₃(4-Me)— | —NH— | n-Bu | 2BO/4EO |
| 139 | Ni | 4 | H | -3-SC₆H₃(4-Me)— | —NH— | n-Bu | 3BO/2EO |
| 140 | Co | 2 | H | -4-OC₆H₄— | —N(2PO)— | Me | 2PO/7EO |
| 142 | Co | 2 | H | -4-OC₆H₄— | —N(2PO/1EO)— | n-Bu | 6BO/6EO |
| 143 | Co | 3 | H | -4-OC₆H₄— | —NH— | Me | 2PO/10EO |
| 144 | Co | 4 | H | -4-OC₆H₄— | —NH— | n-Bu | 2BO/3EO |
| 145 | Co | 2 | di-OEt | -4-OC₆H₄— | —NH— | Me | 4PO/3EO |
| 146 | Co | 4 | H | -4-OC₆H₄— | —NH— | n-Bu | 2BO/4EO |
| 147 | Co | 2 | H | -3-OC₆H₃(4-OMe)— | —N(CH₂C₆H₅)— | Me | 2PO/14EO |
| 148 | Co | 2 | H | -3-OC₆H₃(4-OMe)— | —NH— | Me | 4PO/3EO |
| 149 | Co | 2 | tetra-O-t-C₄H₉ | -3-OC₆H₃(4-OMe)— | —NH— | Me | 2BO/6EO |
| 150 | Co | 2 | H | -5-OC₆H₃(2-OMe)— | —NH— | Me | 5PO/3EO |
| 151 | Co | 4 | H | -5-OC₆H₃(2-OMe)— | —NH— | Me | 2PO/10EO |
| 152 | Co | 4 | H | -4-OC₆H₃(2-OMe)— | —NH— | n-Bu | 2BO/3EO |
| 153 | Co | 2 | H | -3-OC₆H₃(4-Me)— | —NH— | Me | 2PO/14EO |
| 154 | Co | 2 | H | -3-OC₆H₃(4-Me)— | —N(C₂H₅)— | Me | 4PO/3EO |
| 155 | Co | 2 | tetra-O-n-C₄H₉ | -3-OC₆H₃(4-Me)— | —N(CH₃)— | Me | 2PO/8EO |
| 156 | Co | 2 | H | -3-OC₆H₃(4-Me)— | —NH— | Me | 2PO/7EO |
| 157 | Co | 4 | H | -3-OC₆H₃(4-Me)— | —NH— | Me | 2PO/4EO |
| 158 | Co | 4 | H | -3-OC₆H₃(4-Me)— | —NH— | Me | 12 EO |
| 159 | Co | 2 | H | -5-OC₆H₃(2-Me)— | —NH— | n-Bu | 2BO/4EO |
| 160 | Co | 2 | di-Cl | -3-OC₆H₃(4-t-Bu)— | —NH— | Me | 2PO/10EO |
| 161 | Co | 2 | H | -3-OC₆H₃(4-t-Bu)— | —NH— | Me | 4PO/3EO |
| 162 | Co | 2 | di-Me | -3-OC₆H₃(4-t-Bu)— | —NH— | Me | 2PO/7EO |
| 163 | Co | 4 | H | -3-OC₆H₃(4-t-Bu)— | —NH— | Me | 4PO/3EO |
| 164 | Co | 4 | H | -3-OC₆H₃(4-t-Bu)— | —NH— | Me | 3PO/5EO |
| 165 | Co | 2 | H | -4-SC₆H₄— | —NH— | Me | 6PO/3EO |
| 166 | Co | 2 | di-OEt | -4-SC₆H₄— | —NH— | n-Bu | 6BO/6EO |
| 167 | Co | 3 | H | -4-SC₆H₄— | —NH— | Me | 2PO/10EO |
| 168 | Co | 4 | tetra-OCOMe | -4-SC₆H₄— | —NH— | n-Bu | 2BO/3EO |
| 169 | Co | 3 | H | -4-SC₆H₄— | —N(CH₃)— | Me | 2PO/4EO |
| 170 | Co | 2 | H | -3-SC₆H₃(4-OMe)— | —N(CH₃)— | n-Bu | 8PO/8EO |
| 171 | Co | 2 | H | -3-SC₆H₃(4-OMe)— | —NH— | Me | 4PO/3EO |
| 172 | Co | 4 | H | -3-SC₆H₃(4-OMe)— | —NH— | Me | 2PO/7EO |
| 173 | Co | 2 | di-OCOMe | -3-SC₆H₃(4-Me)— | —NH— | Me | 5PO/5EO |
| 174 | Co | 2 | H | -3-SC₆H₃(4-Me)— | —NH— | Me | 4PO/3EO |
| 175 | Co | 4 | H | -3-SC₆H₃(4-Me)— | —N(C₂H₄OH)— | Me | 2PO/5EO |
| 176 | Co | 2 | tetra-Cl | -3-SC₆H₃(4-Me)— | —NH— | n-Bu | 2BO/4EO |

TABLE 1-continued

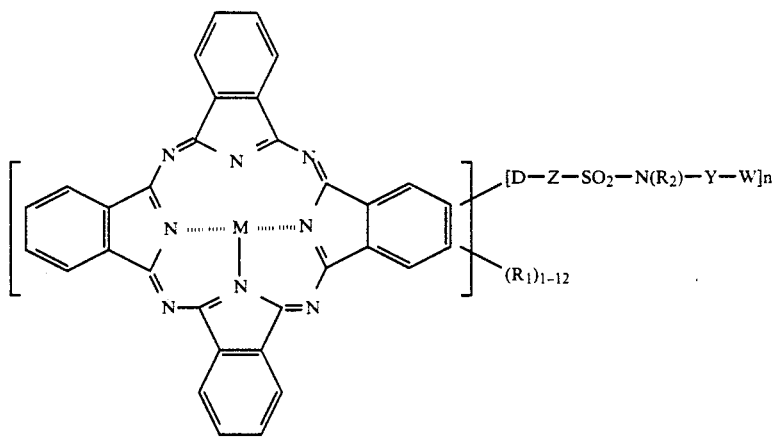

| Example | M | n | (R₁)₁₋₁₂ | —D—Z— | —N(R₂)— | W | Y |
|---|---|---|---|---|---|---|---|
| 177 | Co | 4 | H | -3-SC$_6$H$_3$(4-Me)— | —NH— | n-Bu | 3BO/2EO |

TABLE 2

| Example | A—{D—Z—SO$_2$—N(R$_2$)—Y—W} | n |
|---|---|---|
| 1 | A—{OC$_2$H$_4$S—[thiazole]—C$_6$H$_4$—SO$_2$N(Me)—10PO—CH$_2$CH(Me)NH$_2$} | 2 |
| 2 | A—{OC$_2$H$_4$S—[thiazole]—C$_6$H$_3$(OMe)—SO$_2$N(Et)—(8PO)—(CH$_2$)$_6$—O—(5PO)—CH$_2$CH(Me)N(Me)$_2$} | 2 |
| 3 | A—{SC$_2$H$_4$S—[thiadiazole]—C$_6$H$_4$—SO$_2$N(Me)—(5BO)—NH—(14EO)—CH$_2$CH(Me)—C$_6$H$_5$} | 4 |
| 4 | A—{OCH$_2$—[furan]—SO$_2$NH—15PO/5PO—CH$_2$CH(Me)NH—Me} | 4 |
| 5 | A—{SCH$_2$—[thiophene]—SO$_2$NH—(4BO)—C$_6$H$_4$—(4BO)—CH$_2$CH(Me)NH—C$_6$H$_4$(4-NH$_2$)} | 2 |
| 6 | A—{OCH$_2$—N(SO$_2$Me)—[thiazole]—C$_6$H$_3$—SO$_2$NH—(5PO)—N(Me)—(10PO)—CH$_2$CH(OH)Me} | 4 |
| 7 | A—{OCH$_2$CH$_2$O—C$_6$H$_3$(OMe)—SO$_2$NH—(5PO)—NHCONH—(5PO)—C$_2$H$_5$} | 3 |

TABLE 2-continued

| Example | A—{D—Z—SO$_2$—N(R$_2$)—Y—W} | n |
|---|---|---|
| 8 | A—{OCH$_2$CH$_2$O—[3-OCH$_2$CH$_2$O, 4-MeO-phenyl]—SO$_2$NH—(BPO)—NH(C$_6$H$_{11}$)—(10EO)—C$_2$H$_4$OMe} | 2 |
| 9 | A—{O—[naphthyl]—SO$_2$NH—20EO—CH$_2$CH$_2$O—C$_6$H$_5$} | 4 |
| 10 | A—{[2,3-di-O-naphthyl]—SO$_2$NH—15PO—CH$_2$CH$_2$—C$_6$H$_{11}$} | 2 |
| 11 | A—{O—[biphenyl]—SO$_2$NH—(10PO)—N(Et)—(5BO)—C$_2$H$_4$OEt} | 4 |
| 12 | A—{[benzoxazole-phenyl]—SO$_2$NH—(8PO)—N(SO$_2$A)—(15PO)—C$_2$H$_5$C$_6$H$_5$} | 4 |
| 13 | A—{[benzothiazole-phenyl]—SO$_2$NH—(15PO)—NH—(5EO)—C$_2$H$_4$OC$_6$H$_5$} | 2 |
| 14 | A—{[thiadiazole-phenyl]—SO$_2$NH—(10PO)—N(C$_6$H$_5$)—(10PO)—C$_2$H$_5$} | 2 |

TABLE 2-continued

| Example | A—{D—Z—SO$_2$—N(R$_2$)—Y—W} | n |
|---|---|---|
| 15 | A—{O-[8-quinolinyl]-5-SO$_2$NH—3BO/10PO/5EO—C$_2$H$_4$C$_6$H$_{11}$} | 4 |

A = [Cu phthalocyanine]—

TABLE 3

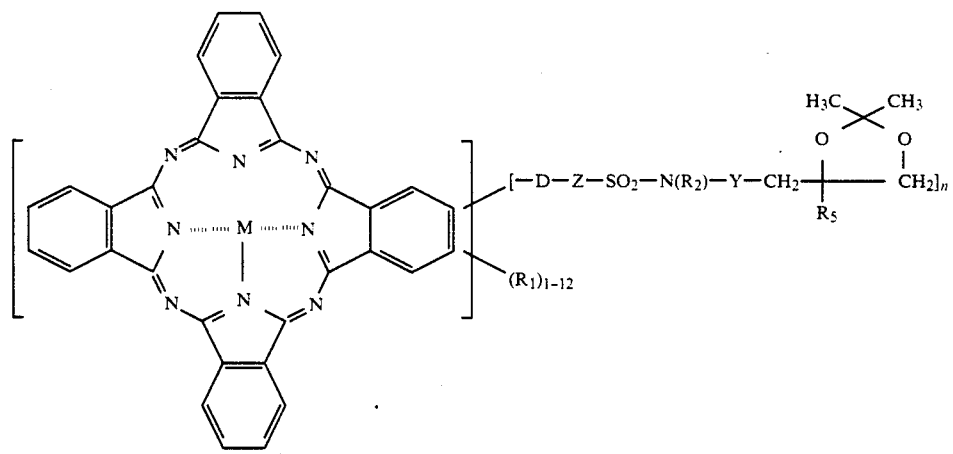

| Example | M | n | (R$_1$)$_{1-12}$ | —D—Z— | —N(R$_2$)— | R$_5$ | Y |
|---|---|---|---|---|---|---|---|
| 1 | Cu | 2 | H | -4-OC$_6$H$_4$— | —NH— | H | 3PO/1EO |
| 2 | Cu | 3 | H | -4-OC$_6$H$_4$— | —NH— | H | 6BO/6EO |
| 3 | Cu | 2 | tetra-Cl | -4-OC$_6$H$_4$— | —NH— | H | 2PO/10EO |
| 4 | Cu | 4 | di-Cl | -4-OC$_6$H$_4$— | —NH— | Me | 2BO/3EO |
| 5 | Cu | 2 | H | -4-OC$_6$H$_4$— | —NH— | H | 4PO/3EO |
| 6 | Cu | 4 | H | -4-OC$_6$H$_4$— | —NH— | H | 2BO/4EO |
| 7 | Cu | 1 | tri-Cl | -3-OC$_6$H$_3$(4-OMe)— | —NH— | H | 2PO/14EO |
| 8 | Cu | 2 | H | -3-OC$_6$H$_3$(4-OMe)— | —NH— | H | 4PO/3EO |
| 9 | Cu | 3 | tetra-Br | -3-OC$_6$H$_3$(4-OMe)— | —NH— | H | 9PO/1EO |
| 10 | Cu | 4 | Me | -3-OC$_6$H$_3$(4-OMe)— | —NH— | H | 2BO/6EO |
| 11 | Cu | 2 | H | -5-OC$_6$H$_3$(2-OMe)— | —NH— | H | 5PO/3EO |
| 12 | Cu | 3 | di-Me | -5-OC$_6$H$_3$(2-OMe)— | —NH— | H | 2PO/10EO |
| 13 | Cu | 4 | H | -5-OC$_6$H$_3$(2-OMe)— | —NH— | H | 2BO/3EO |
| 14 | Cu | 2 | tri-Br | -5-OC$_6$H$_3$(2-OMe)— | —NH— | H | 4PO/3EO |
| 15 | Cu | 3 | H | -5-OC$_6$H$_3$(2-OMe)— | —NH— | H | 9PO/1EO |
| 16 | Cu | 4 | H | -5-OC$_6$H$_3$(2-OMe)— | —NH— | Me | 3BO/6EO |
| 17 | Cu | 3 | di-Cl | -5-OC$_6$H$_3$(2-OMe)— | —NH— | Me | 2BO/3EO |
| 18 | Cu | 4 | tetra-Et | -5-OC$_6$H$_3$(2-OMe)— | —NH— | Me | 4BO/3EO |
| 19 | Cu | 2 | H | -4-OC$_6$H$_3$(3-OMe)— | —NH— | H | 4PO/3EO |
| 20 | Cu | 2 | H | -4-OC$_6$H$_3$(3-OMe)— | —NH— | H | 4PO/3EO |
| 21 | Cu | 3 | tetra-Cl | -4-OC$_6$H$_3$(3-OMe)— | —NH— | H | 9PO/1EO |
| 22 | Cu | 4 | H | -4-OC$_6$H$_3$(3-OMe)— | —NH— | H | 2PO/7EO |
| 23 | Cu | 1 | di-Br | -5-OC$_6$H$_2$(2,6-di-OMe)— | —NH— | Me | 3BO/4EO |

TABLE 3-continued

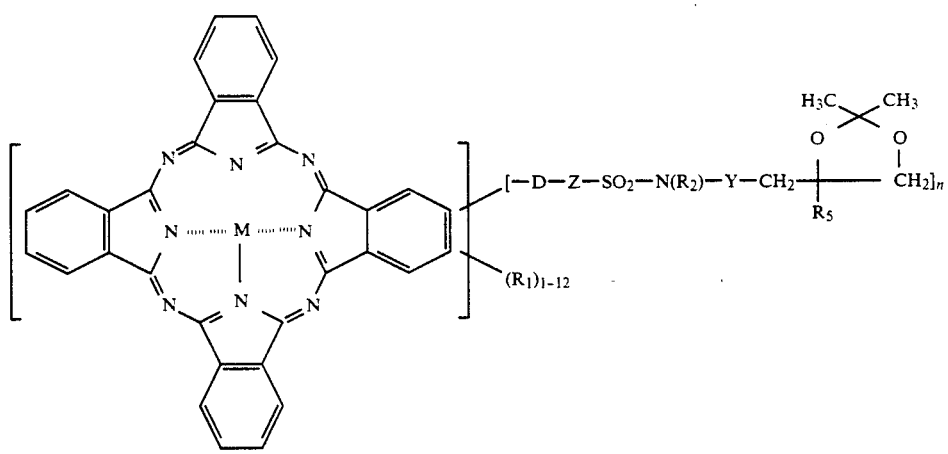

| Example | M | n | (R₁)₁₋₁₂ | —D—Z— | —N(R₂)— | R₅ | Y |
|---|---|---|---|---|---|---|---|
| 24 | Cu | 2 | H | -5-OC₆H₂(2,6-di-OMe)— | —NH— | Me | 10 EO |
| 25 | Cu | 1 | di-OMe | -3-OC₆H₃(4-Me)— | —NH— | Me | 2PO/14EO |
| 26 | Cu | 2 | H | -3-OC₆H₃(4-Me)— | —NH— | Et | 4PO/3EO |
| 27 | Cu | 3 | H | -3-OC₆H₃(4-Me)— | —NH— | H | 2PO/8EO |
| 28 | Cu | 4 | tetra-I | -3-OC₆H₃(4-Me)— | —NH— | H | 2PO/7EO |
| 29 | Cu | 2 | H | -3-OC₆H₃(4-Me)— | —NH— | H | 2PO/4EO |
| 30 | Cu | 4 | tetra-t-C₄H₉ | -3-OC₆H₃(4-Me)— | —NH— | Me | 12 EO |
| 31 | Cu | 1 | H | -5-OC₆H₃(2-Me)— | —NH— | Me | 2BO/4EO |
| 32 | Cu | 2 | H | -5-OC₆H₃(2-Me)— | —NH— | Et | 2BO/6EO |
| 33 | Cu | 3 | tetra-n-C₄H₉ | -5-OC₆H₃(2-Me)— | —NH— | H | 2PO/1EO |
| 34 | Cu | 4 | H | -5-OC₆H₃(2-Me)— | —NH— | H | 2PO/7EO |
| 35 | Cu | 2 | tetra-Et | -5-OC₆H₃(2-Me)— | —NH— | H | 2PO/4EO |
| 36 | Cu | 4 | H | -5-OC₆H₃(2-Me)— | —NH— | H | 3BO/6EO |
| 37 | Cu | 1 | di-Br | -4-OC₆H₃(3-Me)— | —NH— | H | 2PO/6EO |
| 38 | Cu | 2 | H | -4-OC₆H₃(3-Me)— | —NH— | H | 2PO/10EO |
| 39 | Cu | 3 | di-I | -4-OC₆H₃(3-Me)— | —NH— | H | 3PO/4EO |
| 40 | Cu | 4 | tetra-I | -4-OC₆H₃(3-Me)— | —NH— | H | 8PO/2EO |
| 41 | Cu | 1 | H | -5-OC₆H₂(2,6-di-Me)— | —NH— | Me | 3PO/6EO |
| 42 | Cu | 2 | H | -5-OC₆H₂(2,6-di-Me)— | —NH— | Me | 4PO/3EO |
| 43 | Cu | 1 | tetra-Cl | -3-OC₆H₃(4-OEt)— | —NH— | Et | 3BO/10EO |
| 44 | Cu | 2 | H | -3-OC₆H₃(4-Et)— | —NH— | Et | 2BO/4EO |
| 45 | Cu | 3 | H | -3-OC₆H₃(4-OEt)— | —NH— | Et | 8PO/4EO |
| 46 | Cu | 4 | di-Br | -3-OC₆H₃(4-OEt)— | —NH— | Me | 2PO/6EO |
| 47 | Cu | 1 | H | -5-OC₆H₃(2-OEt)— | —NH— | Me | 2PO/8EO |
| 48 | Cu | 1 | H | -5-OC₆H₃(2-OEt)— | —NH— | Me | 4PO/3EO |
| 49 | Cu | 3 | tetra-Et | -5-OC₆H₃(2-OEt)— | —NH— | Me | 2BO/4EO |
| 50 | Cu | 4 | H | -5-OC₆H₃(2-OEt)— | —NH— | Me | 2PO/7EO |
| 51 | Cu | 3 | H | -5-OC₆H₃(2-OEt)— | —NH— | H | 8PO/8EO |
| 52 | Cu | 4 | H | -5-OC₆H₃(2-OEt)— | —NH— | H | 2PO/5EO |
| 53 | Cu | 1 | di-OCOMe | -4-OC₆H₃(3-OEt)— | —NH— | H | 2PO/4EO |
| 54 | Cu | 2 | H | -4-OC₆H₃(3-OEt)— | —NH— | H | 4PO/3EO |
| 55 | Cu | 3 | H | -4-OC₆H₃(3-OEt)— | —NH— | H | 9PO/1EO |
| 56 | Cu | 4 | H | -4-OC₆H₃(3-OEt)— | —NH— | H | 5PO/3EO |
| 57 | Cu | 1 | H | -3-OC₆H₃(4-t-Bu)— | —NH— | Me | 2PO/10EO |
| 58 | Cu | 2 | H | -3-OC₆H₃(4-t-Bu)— | —NH— | Me | 4PO/3EO |
| 59 | Cu | 3 | tetra-Br | -3-OC₆H₃(4-t-Bu)— | —NH— | Me | 6PO/6EO |
| 60 | Cu | 4 | H | -3-OC₆H₃(4-t-Bu)— | —NH— | Et | 2PO/7EO |
| 61 | Cu | 2 | H | -3-OC₆H₃(4-t-Bu)— | —NH— | Et | 4PO/3EO |
| 62 | Cu | 4 | di-Cl | -3-OC₆H₃(4-t-Bu)— | —NH— | Et | 3PO/5EO |
| 63 | Cu | 1 | tetra-Me | -3-OC₆H₃(4-Cl)— | —NH— | H | 2PO/10EO |
| 64 | Cu | 2 | H | -3-OC₆H₃(4-Cl)— | —NH— | H | 4PO/3EO |
| 65 | Cu | 3 | H | -3-OC₆H₃(4-Cl)— | —NH— | H | 6PO/6EO |
| 66 | Cu | 4 | H | -3-OC₆H₃(4-Cl)— | —NH— | H | 2PO/7EO |
| 67 | Cu | 1 | di-Me | -5-OC₆H₃(2-Cl)— | —NH— | H | 4BO/4EO |
| 68 | Cu | 2 | H | -5-OC₆H₃(2-Cl)— | —NH— | H | 4PO/3EO |
| 69 | Cu | 3 | H | -5-OC₆H₃(2-Cl)— | —NH— | H | 3PO/3EO |
| 70 | Cu | 4 | H | -5-OC₆H₃(2-Cl)— | —NH— | H | 2PO/7EO |
| 71 | Cu | 1 | H | -3-OC₆H₃(4-Br)— | —NH— | H | 2PO/31EO |
| 72 | Cu | 2 | H | -3-OC₆H₃(4-Br)— | —NH— | H | 4PO/3EO |
| 73 | Cu | 3 | H | -3-OC₆H₃(4-Br)— | —NH— | H | 9PO/1EO |
| 74 | Cu | 4 | H | -3-OC₆H₃(4-Br)— | —NH— | H | 2PO/7EO |
| 75 | Cu | 1 | tetra-Cl | -4-SC₆H₄— | —NH— | H | 6PO/3EO |
| 76 | Cu | 2 | H | -4-SC₆H₄— | —NH— | H | 6BO/6EO |
| 77 | Cu | 3 | H | -4-SC₆H₄— | —NH— | Me | 2PO/10EO |
| 78 | Cu | 4 | tetra-Br | -4-SC₆H₄— | —NH— | Me | 2BO/3EO |
| 79 | Cu | 2 | H | -4-SC₆H₄— | —NH— | Me | 2PO/4EO |
| 80 | Cu | 4 | tetra-t-Bu | -4-SC₆H₄— | —NH— | Me | 2PO/6EO |
| 81 | Cu | 1 | H | -3-SC₆H₃(4-OMe)— | —NH— | H | 8PO/8EO |

TABLE 3-continued

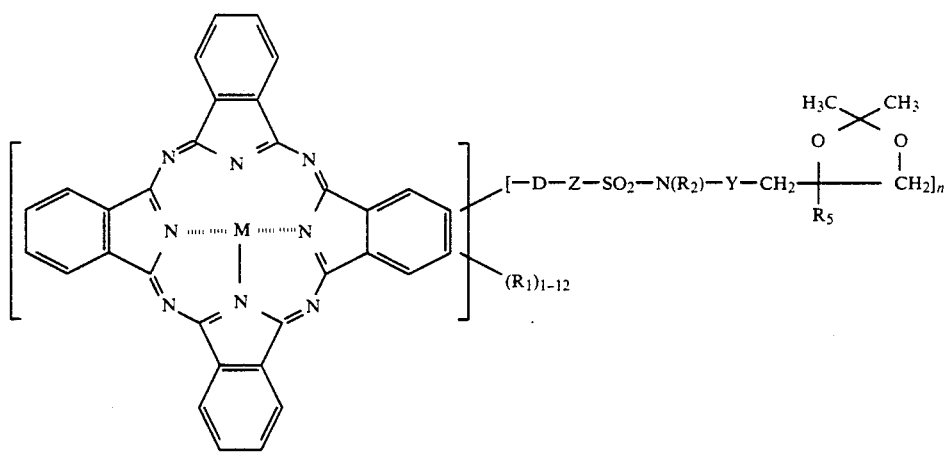

| Example | M | n | $(R_1)_{1-12}$ | —D—Z— | —N($R_2$)— | $R_5$ | Y |
|---|---|---|---|---|---|---|---|
| 82 | Cu | 2 | H | -3-SC$_6$H$_3$(4-OMe)— | —NH— | H | 4PO/3EO |
| 83 | Cu | 3 | H | -3-SC$_6$H$_3$(4-OMe)— | —NH— | H | 4PO/3EO |
| 83 | Cu | 3 | H | -3-SC$_6$H$_3$(4-OMe)— | —NH— | H | 9PO/1EO |
| 84 | Cu | 4 | H | -3-SC$_6$H$_3$(4-OMe)— | —NH— | H | 2PO/7EO |
| 85 | Cu | 1 | di-Cl | -3-SC$_6$H$_3$(4-Me)— | —NH— | H | 5PO/5EO |
| 86 | Cu | 2 | tetra-Cl | -3-SC$_6$H$_3$(4-Me)— | —NH— | H | 4PO/3EO |
| 87 | Cu | 3 | H | -3-SC$_6$H$_3$(4-Me)— | —NH— | H | 3BO/2EO |
| 88 | Cu | 4 | H | -3-SC$_6$H$_3$(4-Me)— | —NH— | H | 2PO/5EO |
| 89 | Cu | 2 | H | -3-SC$_6$H$_3$(4-Me)— | —NH— | Me | 2BO/4EO |
| 90 | Cu | 4 | H | -3-SC$_6$H$_3$(4-Me)— | —NH— | Me | 3BO/2EO |
| 91 | Cu | 1 | tri-Br | -3-SC$_6$H$_3$(4-Cl)— | —NH— | H | 2PO/16EO |
| 92 | Cu | 2 | H | -3-SC$_6$H$_3$(4-Cl)— | —NH— | H | 4PO/3EO |
| 93 | Cu | 3 | H | -3-SC$_6$H$_3$(4-Cl)— | —NH— | H | 4PO/2EO |
| 94 | Cu | 4 | H | -3-SC$_6$H$_3$(4-Cl)— | —NH— | H | 2PO/7EO |
| 96 | Ni | 2 | di-OMe | -4-OC$_6$H$_4$— | —NH— | Me | 6BO/6EO |
| 97 | Ni | 3 | H | -4-OC$_6$H$_4$— | —NH— | Me | 2PO/10EO |
| 98 | Ni | 4 | H | -4-OC$_6$H$_4$— | —NH— | Me | 2BO/3EO |
| 99 | Ni | 2 | H | -4-OC$_6$H$_4$— | —NH— | Me | 4PO/3EO |
| 100 | Ni | 4 | di-Cl | -4-OC$_6$H$_4$— | —NH— | Me | 2BO/4EO |
| 101 | Ni | 1 | H | -3-OC$_6$H$_3$(4-OMe)— | —NH— | H | 2PO/14EO |
| 102 | Ni | 2 | H | -3-OC$_6$H$_3$(4-OMe)— | —NH— | H | 4PO/3EO |
| 103 | Ni | 1 | H | -5-OC$_6$H$_3$(2-OMe)— | —NH— | H | 5PO/3EO |
| 104 | Ni | 2 | H | -5-OC$_6$H$_3$(2-OMe)— | —NH— | H | 2PO/10EO |
| 105 | Ni | 4 | H | -5-OC$_6$H$_3$(2-OMe)— | —NH— | H | 2BO/3EO |
| 106 | Ni | 1 | tetra-Me | -3-OC$_6$H$_3$(4-Me)— | —NH— | H | 2PO/14EO |
| 107 | Ni | 2 | H | -3-OC$_6$H$_3$(4-Me)— | —NH— | H | 4PO/3EO |
| 108 | Ni | 4 | H | -3-OC$_6$H$_3$(4-Me)— | —NH— | H | 2PO/7EO |
| 109 | Ni | 2 | H | -3-OC$_6$H$_3$(4-Me)— | —NH— | Me | 2PO/4EO |
| 110 | Ni | 4 | H | -3-OC$_6$H$_3$(4-Me)— | —NH— | Me | 12 EO |
| 111 | Ni | 1 | tetra-I | -5-OC$_6$H$_3$(2-Me)— | —NH— | Et | 2BO/4EO |
| 112 | Ni | 2 | di-OEt | -5-OC$_6$H$_3$(2-Me)— | —NH— | H | 2BO/6EO |
| 113 | Ni | 2 | H | -5-OC$_6$H$_3$(2-Me)— | —NH— | H | 2PO/4EO |
| 114 | Ni | 4 | H | -5-OC$_6$H$_3$(2-Me)— | —NH— | H | 3BO/3EO |
| 115 | Ni | 1 | H | -5-OC$_6$H$_2$(2,6-di-Me)— | —NH— | H | 3PO/6EO |
| 116 | Ni | 2 | tetra-Et | -5-OC$_6$H$_2$(2,6-di-Me)— | —NH— | H | 4PO/3EO |
| 117 | Ni | 1 | H | -3-OC$_6$H$_3$(4-OEt)— | —NH— | H | 3BO/10EO |
| 118 | Ni | 1 | H | -5-OC$_6$H$_3$(2-OEt)— | —NH— | H | 2PO/8EO |
| 119 | Ni | 2 | H | -5-OC$_6$H$_3$(2-OEt)— | —NH— | H | 4PO/3EO |
| 120 | Ni | 1 | tetra-OMe | -3-OC$_6$H$_3$(4-t-Bu)— | —NH— | Me | 2PO/10EO |
| 121 | Ni | 2 | H | -3-OC$_6$H$_3$(4-t-Bu)— | —NH— | Me | 4PO/3EO |
| 122 | Ni | 4 | H | -3-OC$_6$H$_3$(4-t-Bu)— | —NH— | Me | 2PO/7EO |
| 123 | Ni | 2 | di-OMe | -3-OC$_6$H$_3$(4-t-Bu)— | —NH— | Me | 4PO/3EO |
| 124 | Ni | 4 | H | -3-OC$_6$H$_3$(4-t-Bu)— | —NH— | Me | 3PO/5EO |
| 125 | Ni | 1 | H | -3-OC$_6$H$_3$(4-Cl)— | —NH— | H | 2PO/10EO |
| 126 | Ni | 2 | H | -3-OC$_6$H$_3$(4-Cl)— | —NH— | H | 4PO/3EO |
| 127 | Ni | 4 | H | -3-OC$_6$H$_3$(4-Br)— | —NH— | H | 2PO/7EO |
| 128 | Ni | 1 | tetra-I | -4-SC$_6$H$_4$— | —NH— | H | 6PO/3EO |
| 129 | Ni | 2 | H | -4-SC$_6$H$_4$— | —NH— | H | 6BO/6EO |
| 130 | Ni | 3 | H | -4-SC$_6$H$_4$— | —NH— | Me | 2PO/10EO |
| 131 | Ni | 4 | H | -4-SC$_6$H$_4$— | —NH— | Me | 2BO/3EO |
| 132 | Ni | 2 | H | -4-SC$_6$H$_4$— | —NH— | Me | 2PO/4EO |
| 133 | Ni | 4 | di-OMe | -4-SC$_6$H$_4$— | —NH— | H | 2PO/6EO |
| 134 | Ni | 1 | H | -3-SC$_6$H$_3$(4-Me)— | —NH— | H | 5PO/5EO |
| 135 | Ni | 2 | H | -3-SC$_6$H$_3$(4-Me)— | —NH— | H | 4PO/3EO |
| 136 | Ni | 3 | di-Br | -3-SC$_6$H$_3$(4-Me)— | —NH— | H | 3BO/2EO |
| 137 | Ni | 4 | H | -3-SC$_6$H$_3$(4-Me)— | —NH— | H | 2PO/5EO |
| 138 | Ni | 2 | H | -3-SC$_6$H$_3$(4-Me)— | —NH— | Me | 2BO/4EO |
| 139 | Ni | 4 | tetra-Cl | -3-SC$_6$H$_3$(4-Me)— | —NH— | Me | 3BO/2EO |

TABLE 3-continued

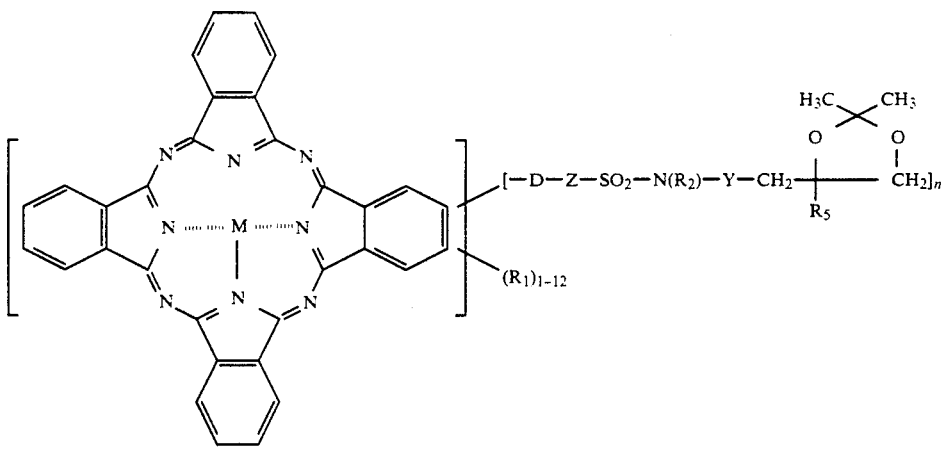

| Example | M | n | (R$_1$)$_{1-12}$ | —D—Z— | —N(R$_2$)— | R$_5$ | Y |
|---|---|---|---|---|---|---|---|
| 140 | Co | 1 | H | -4-OC$_6$H$_4$— | —NH— | Me | 2PO/7EO |
| 142 | Co | 2 | H | -4-OC$_6$H$_4$— | —NH— | Me | 6BO/6EO |
| 143 | Co | 3 | tetra-O-t-Bu | -4-OC$_6$H$_4$— | —NH— | Me | 2PO/10EO |
| 144 | Co | 4 | H | -4-OC$_6$H$_4$— | —NH— | Me | 2BO/3EO |
| 145 | Co | 2 | di-I | -4-OC$_6$H$_4$— | —NH— | Me | 4PO/3EO |
| 146 | Co | 4 | tetra-I | -4-OC$_6$H$_4$— | —NH— | Me | 2BO/4EO |
| 147 | Co | 1 | H | -3-OC$_6$H$_3$(4-OMe)— | —NH— | H | 2PO/14EO |
| 148 | Co | 2 | H | -3-OC$_6$H$_3$(4-OMe)— | —NH— | H | 4PO/3EO |
| 149 | Co | 4 | H | -3-OC$_6$H$_3$(4-OMe)— | —NH— | H | 2BO/6EO |
| 150 | Co | 1 | H | -3-OC$_6$H$_3$(2-OMe)— | —NH— | H | 5PO/3EO |
| 151 | Co | 2 | H | -5-OC$_6$H$_3$(2-OMe)— | —NH— | H | 2PO/10EO |
| 152 | Co | 4 | H | -5-OC$_6$H$_3$(2-OMe)— | —NH— | H | 2BO/3EO |
| 153 | Co | 1 | di-Br | -3-OC$_6$H$_3$(4-Me)— | —NH— | H | 2PO/14EO |
| 154 | Co | 2 | H | -3-OC$_6$H$_3$(4-Me)— | —NH— | H | 4PO/3EO |
| 155 | Co | 3 | H | -3-OC$_6$H$_3$(4-Me)— | —NH— | H | 2PO/8EO |
| 156 | Co | 4 | H | -3-OC$_6$H$_3$(4-Me)— | —NH— | H | 2PO/7EO |
| 157 | Co | 2 | di-Me | -3-OC$_6$H$_3$(4-Me)— | —NH— | H | 2PO/4EO |
| 158 | Co | 4 | H | -3-OC$_6$H$_3$(4-Me)— | —NH— | H | 12 EO |
| 159 | Co | 1 | H | -5-OC$_6$H$_3$(2-Me)— | —NH— | H | 2BO/4EO |
| 160 | Co | 1 | H | -3-OC$_6$H$_3$(4-t-Bu)— | —NH— | H | 2PO/10EO |
| 161 | Co | 2 | H | -3-OC$_6$H$_3$(4-t-Bu)— | —NH— | H | 4PO/3EO |
| 162 | Co | 4 | tetra-Cl | -3-OC$_6$H$_3$(4-t-Bu)— | —NH— | H | 2PO/7EO |
| 163 | Co | 2 | H | -3-OC$_6$H$_3$(4-t-Bu)— | —NH— | H | 4PO/3EO |
| 164 | Co | 4 | H | -3-OC$_6$H$_3$(4-t-Bu)— | —NH— | H | 3PO/5EO |
| 165 | Co | 1 | H | -4-SC$_6$H$_4$— | —NH— | H | 6PO/3EO |
| 166 | Co | 2 | di-OEt | -4-SC$_6$H$_4$— | —NH— | H | 6BO/6EO |
| 167 | Co | 3 | H | -4-SC$_6$H$_4$— | —NH— | H | 2PO/10EO |
| 168 | Co | 4 | H | -4-SC$_6$H$_4$— | —NH— | H | 2BO/3EO |
| 169 | Co | 3 | di-I | -4-SC$_6$H$_4$— | —NH— | H | 2PO/4EO |
| 170 | Co | 1 | H | -3-SC$_6$H$_3$(4-OMe)— | —NH— | H | 8PO/8EO |
| 171 | Co | 2 | H | -3-S—C$_6$H$_3$(4-OMe)— | —NH— | H | 4PO/3EO |
| 172 | Co | 4 | H | -3-SC$_6$H$_3$(4-OMe)— | —NH— | H | 2PO/7EO |
| 173 | Co | 1 | tetra-Cl | -3-SC$_6$H$_3$(4-Me)— | —NH— | H | 5PO/5EO |
| 174 | Co | 2 | H | -3-SC$_6$H$_3$(4-Me)— | —NH— | H | 4PO/3EO |
| 175 | Co | 4 | H | -3-SC$_6$H$_3$(4-Me)— | —NH— | H | 2PO/5EO |
| 176 | Co | 2 | tri-Cl | -3-SC$_6$H$_3$(4-Me)— | —NH— | H | 2BO/4EO |
| 177 | Co | 4 | H | -3-SC$_6$H$_3$(4-Me)— | —NH— | H | 3BO/2EO |

TABLE 4

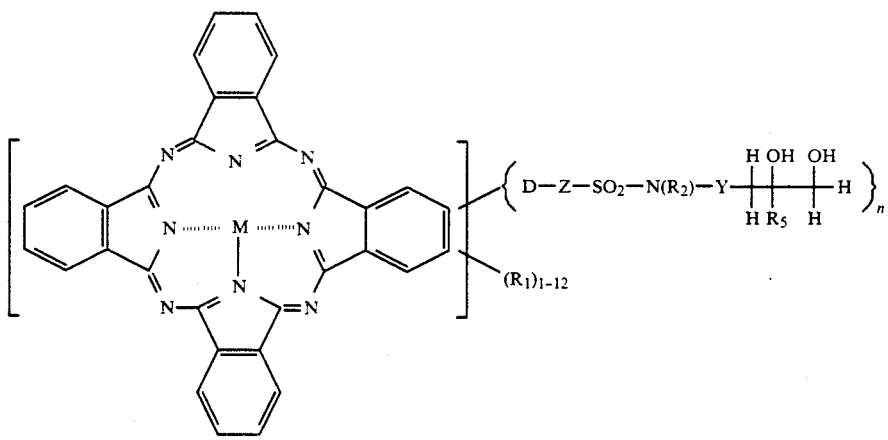

| Example | M | n | (R₁)₁₋₁₂ | —D—Z— | —N(R₂)— | R₅ | Y |
|---|---|---|---|---|---|---|---|
| 1 | Cu | 2 | H | -4-OC₆H₄— | —NH— | H | 3PO/1EO |
| 2 | Cu | 3 | H | -4-OC₆H₄— | —NH— | H | 6BO/6EO |
| 3 | Cu | 2 | tetra-Cl | -4-OC₆H₄— | —NH— | H | 2PO/10EO |
| 4 | Cu | 4 | di-OMe | -4-OC₆H₄— | —NH— | Me | 2BO/3EO |
| 5 | Cu | 2 | H | -4-OC₆H₄— | —NH— | H | 4PO/3EO |
| 6 | Cu | 4 | H | -4-OC₆H₄— | —NH— | H | 2BO/4EO |
| 7 | Cu | 1 | di-Br | -3-OC₆H₃(4-OMe)— | —NH— | H | 2PO/14EO |
| 8 | Cu | 2 | H | -3-OC₆H₃(4-OMe)— | —NH— | H | 4PO/3EO |
| 9 | Cu | 3 | tetra-I | -3-OC₆H₃(4-OMe)— | —NH— | H | 9PO/1EO |
| 10 | Cu | 4 | Me | -3-OC₆H₃(4-OMe)— | —NH— | H | 2BO/6EO |
| 11 | Cu | 2 | H | -5-OC₆H₃(2-OMe)— | —NH— | H | 5PO/3EO |
| 12 | Cu | 3 | di-Et | -5-OC₆H₃(2-OMe)— | —NH— | H | 2PO/10EO |
| 13 | Cu | 4 | H | -5-OC₆H₃(2-OMe)— | —NH— | H | 2BO/3EO |
| 14 | Cu | 2 | tri-Cl | -5-OC₆H₃(2-OMe)— | —NH— | H | 4PO/3EO |
| 15 | Cu | 3 | H | -5-OC₆H₃(2-OMe)— | —NH— | H | 9PO/1EO |
| 16 | Cu | 4 | H | -5-OC₆H₃(2-OMe)— | —NH— | Me | 3BO/6EO |
| 17 | Cu | 3 | di-I | -5-OC₆H₃(2-OMe)— | —NH— | Me | 2BO/3EO |
| 18 | Cu | 4 | tetra-Me | -5-OC₆H₃(2-OMe)— | —NH— | Me | 4BO/3EO |
| 20 | Cu | 2 | H | -4-OC₆H₃(3-OMe)— | —NH— | H | 4PO/3EO |
| 21 | Cu | 3 | tetra-Br | -4-OC₆H₃(3-OMe)— | —NH— | H | 9PO/1EO |
| 22 | Cu | 4 | H | -4-OC₆H₃(3-OMe)— | —NH— | H | 2PO/7EO |
| 23 | Cu | 1 | tri-Br | -5-OC₆H₂(2,6-di-OMe)— | —NH— | Me | 3BO/4EO |
| 24 | Cu | 2 | H | -5-OC₆H₂(2,6-di-OMe)— | —NH— | Me | 10 EO |
| 25 | Cu | 1 | di-Cl | -3-OC₆H₃(4-Me)— | —NH— | Me | 2PO/14EO |
| 26 | Cu | 2 | H | -3-OC₆H₃(4-Me)— | —NH— | Et | 4PO/3EO |
| 27 | Cu | 3 | H | -3-OC₆H₃(4-Me)— | —NH— | H | 2PO/8EO |
| 28 | Cu | 4 | tetra-I | -3-OC₆H₃(4-Me)— | —NH— | H | 2PO/7EO |
| 29 | Cu | 2 | H | -3-OC₆H₃(4-Me)— | —NH— | H | 2PO/4EO |
| 30 | Cu | 4 | tetra-n-C₄H₉ | -3-OC₆H₃(4-Me)— | —NH— | Me | 12 EO |
| 31 | Cu | 1 | H | -5-OC₆H₃(2-Me)— | —NH— | Me | 2BO/4EO |
| 32 | Cu | 2 | H | -5-OC₆H₃(2-Me)— | —NH— | Et | 2BO/6EO |
| 33 | Cu | 2 | tetra-t-C₄H₉ | -5-OC₆H₃(2-Me)— | —NH— | H | 2PO/1EO |
| 34 | Cu | 4 | H | -5-OC₆H₃(2-Me)— | —NH— | H | 2PO/7EO |
| 35 | Cu | 2 | tetra-Me | -5-OC₆H₃(2-Me)— | —NH— | H | 2PO/4EO |
| 36 | Cu | 4 | H | -5-OC₆H₃(2-Me)— | —NH— | H | 3BO/3EO |
| 37 | Cu | 1 | di-I | -4-OC₆H₃(3-Me)— | —NH— | H | 2PO/6EO |
| 38 | Cu | 2 | H | -4-OC₆H₃(3-Me)— | —NH— | H | 2PO/10EO |
| 39 | Cu | 3 | di-Cl | -4-OC₆H₃(3-Me)— | —NH— | H | 3PO/4EO |
| 40 | Cu | 4 | tetra-I | -4-OC₆H₃(3-Me)— | —NH— | H | 8PO/2EO |
| 41 | Cu | 1 | H | -5-OC₆H₂(2,6-di-Me)— | —NH— | Me | 3PO/6EO |
| 42 | Cu | 2 | H | -5-OC₆H₂(2,6-di-Me)— | —NH— | Me | 4PO/3EO |
| 43 | Cu | 1 | tetra-Br | -3-OC₆H₃(4-OEt)— | —NH— | Et | 3BO/10EO |
| 44 | Cu | 2 | H | -3-OC₆H₃(4-Et)— | —NH— | Et | 2BO/4EO |
| 45 | Cu | 3 | H | -3-OC₆H₃(4-OEt)— | —NH— | Et | 8PO/8EO |
| 46 | Cu | 4 | di-Cl | -3-OC₆H₃(4-OEt)— | —NH— | Me | 2PO/6EO |
| 47 | Cu | 1 | tri-Cl | -5-OC₆H₃(2-OEt)— | —NH— | Me | 2PO/8EO |
| 48 | Cu | 1 | H | -5-OC₆H₃(2-OEt)— | —NH— | Me | 4PO/3EO |
| 49 | Cu | 3 | tetra-Et | -5-OC₆H₃(2-OEt)— | —NH— | Me | 2BO/4EO |
| 50 | Cu | 4 | H | -5-OC₆H₃(2-OEt)— | —NH— | Me | 2PO/7EO |
| 51 | Cu | 3 | H | -5-OC₆H₃(2-OEt)— | —NH— | H | 8PO/8EO |
| 52 | Cu | 4 | H | -5-OC₆H₃(2-OEt)— | —NH— | H | 2PO/5EO |
| 53 | Cu | 1 | di-OCOMe | -4-OC₆H₃(3-OEt)— | —NH— | H | 2PO/4EO |
| 54 | Cu | 2 | H | -4-OC₆H₃(3-OEt)— | —NH— | H | 4PO/3EO |
| 55 | Cu | 3 | H | -4-OC₆H₃(3-OEt)— | —NH— | H | 9PO/1EO |
| 56 | Cu | 4 | H | -4-OC₆H₃(3-OEt)— | —NH— | H | 5PO/3EO |
| 57 | Cu | 1 | H | -3-OC₆H₃(4-t-Bu)— | —NH— | Me | 2PO/10EO |
| 58 | Cu | 2 | H | -3-OC₆H₃(4-t-Bu)— | —NH— | Me | 4PO/3EO |
| 59 | Cu | 3 | tetra-Br | -3-OC₆H₃(4-t-Bu)— | —NH— | Me | 6PO/6EO |
| 60 | Cu | 4 | H | -3-OC₆H₃(4-t-Bu)— | —NH— | Et | 2PO/7EO |

TABLE 4-continued

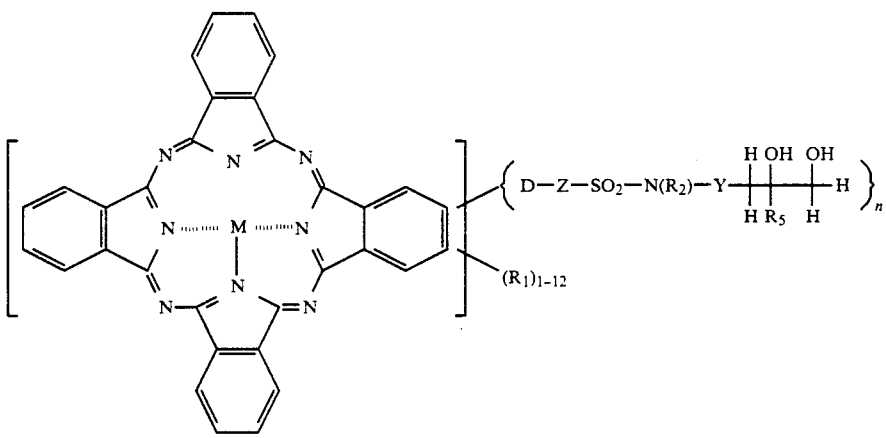

| Example | M | n | (R₁)₁₋₁₂ | —D—Z— | —N(R₂)— | R₅ | Y |
|---|---|---|---|---|---|---|---|
| 61 | Cu | 2 | H | -3-OC₆H₃(4-t-Bu)— | —NH— | Et | 4PO/3EO |
| 62 | Cu | 4 | di-Br | -3-OC₆H₃(4-t-Bu)— | —NH— | Et | 3PO/5EO |
| 63 | Cu | 1 | tetra-Et | -3-OC₆H₃(4-Cl)— | —NH— | H | 2PO/10EO |
| 64 | Cu | 2 | H | -3-OC₆H₃(4-Cl)— | —NH— | H | 4PO/3EO |
| 65 | Cu | 3 | H | -3-OC₆H₃(4-Cl)— | —NH— | H | 6PO/6EO |
| 66 | Cu | 4 | H | -3-OC₆H₃(4-Cl)— | —NH— | H | 2PO/7EO |
| 67 | Cu | 1 | di-OEt | -5-OC₆H₃(2-Cl)— | —NH— | H | 4BO/4EO |
| 68 | Cu | 2 | H | -5-OC₆H₃(2-Cl)— | —NH— | H | 4PO/3EO |
| 69 | Cu | 3 | H | -5-OC₆H₃(2-Cl)— | —NH— | H | 3PO/3EO |
| 70 | Cu | 4 | H | -5-OC₆H₃(2-Cl)— | —NH— | H | 2PO/7EO |
| 71 | Cu | 1 | tri-Cl | -3-OC₆H₃(4-Br)— | —NH— | H | 2PO/31EO |
| 72 | Cu | 2 | H | -3-OC₆H₃(4-Br)— | —NH— | H | 4PO/3EO |
| 73 | Cu | 3 | H | -3-OC₆H₃(4-Br)— | —NH— | H | 9PO/1EO |
| 74 | Cu | 4 | H | -3-OC₆H₃(4-Br)— | —NH— | H | 2PO/7EO |
| 75 | Cu | 1 | tetra-Br | -4-SC₆H₄— | —NH— | H | 6PO/6EO |
| 76 | Cu | 2 | H | -4-SC₆H₄— | —NH— | H | 6BO/6EO |
| 77 | Cu | 3 | H | -4-SC₆H₄— | —NH— | Me | 2PO/10EO |
| 78 | Cu | 4 | tetra-Br | -4-SC₆H₄— | —NH— | Me | 2BO/3EO |
| 79 | Cu | 2 | H | -4-SC₆H₄— | —NH— | Me | 2PO/4EO |
| 80 | Cu | 4 | tetra-n-C₄H₉ | -4-SC₆H₄— | —NH— | Me | 2PO/6EO |
| 81 | Cu | 1 | H | -3-SC₆H₃(4-OMe)— | —NH— | H | 8PO/8EO |
| 82 | Cu | 2 | H | -3-SC₆H₃(4-OMe)— | —NH— | H | 4PO/3EO |
| 83 | Cu | 3 | H | -3-SC₆H₃(4-OMe)— | —NH— | H | 9PO/1EO |
| 84 | Cu | 4 | H | -3-SC₆H₃(4-OMe)— | —NH— | H | 2PO/7EO |
| 85 | Cu | 1 | di-I | -3-SC₆H₃(4-Me)— | —NH— | H | 5PO/5EO |
| 86 | Cu | 2 | tetra-I | -3-SC₆H₃(4-Me)— | —NH— | H | 4PO/3EO |
| 87 | Cu | 3 | H | -3-SC₆H₃(4-Me)— | —NH— | H | 3BO/2EO |
| 88 | Cu | 4 | H | -3-SC₆H₃(4-Me)— | —NH— | H | 2PO/5EO |
| 89 | Cu | 2 | H | -3-SC₆H₃(4-Me)— | —NH— | Me | 2BO/4EO |
| 90 | Cu | 4 | H | -3-SC₆H₃(4-Me)— | —NH— | Me | 3BO/2EO |
| 91 | Cu | 1 | tri-I | -3-SC₆H₃(4-Cl)— | —NH— | H | 2PO/16EO |
| 92 | Cu | 2 | H | -3-SC₆H₃(4-Cl)— | —NH— | H | 4PO/3EO |
| 93 | Cu | 3 | H | -3-SC₆H₃(4-Cl)— | —NH— | H | 4PO/2EO |
| 94 | Cu | 4 | H | -3-SC₆H₃(4-Cl)— | —NH— | H | 2PO/7EO |
| 96 | Ni | 2 | di-OEt | -4-OC₆H₄— | —NH— | Me | 6BO/6EO |
| 97 | Ni | 3 | H | -4-OC₆H₄— | —NH— | Me | 2PO/10EO |
| 98 | Ni | 4 | H | -4-OC₆H₄— | —NH— | Me | 2BO/3EO |
| 99 | Ni | 2 | H | -4-OC₆H₄— | —NH— | Me | 4PO/3EO |
| 100 | Ni | 4 | di-Br | -4-OC₆H₄— | —NH— | Me | 2BO/4EO |
| 101 | Ni | 1 | H | -3-OC₆H₃(4-OMe)— | —NH— | H | 2PO/14EO |
| 102 | Ni | 2 | H | -3-OC₆H₃(4-OMe)— | —NH— | H | 4PO/3EO |
| 103 | Ni | 1 | H | -5-OC₆H₃(2-OMe)— | —NH— | H | 5PO/3EO |
| 104 | Ni | 2 | H | -5-OC₆H₃(2-OMe)— | —NH— | H | 2PO/10EO |
| 105 | Ni | 4 | H | -5-OC₆H₃(2-OMe)— | —NH— | H | 2BO/3EO |
| 106 | Ni | 1 | tetra-OMe | -3-OC₆H₃(4-Me)— | —NH— | H | 2PO/14EO |
| 107 | Ni | 2 | H | -3-OC₆H₃(4-Me)— | —NH— | H | 4PO/3EO |
| 108 | Ni | 4 | H | -3-OC₆H₃(4-Me)— | —NH— | H | 2PO/7EO |
| 109 | Ni | 2 | H | -3-OC₆H₃(4-Me)— | —NH— | Me | 2PO/4EO |
| 110 | Ni | 4 | H | -3-OC₆H₃(4-Me)— | —NH— | Me | 12 EO |
| 111 | Ni | 1 | tetra-I | -5-OC₆H₃(2-Me)— | —NH— | Et | 2BO/4EO |
| 112 | Ni | 2 | di-OMe | -5-OC₆H₃(2-Me)— | —NH— | H | 2BO/6EO |
| 113 | Ni | 2 | H | -5-OC₆H₃(2-Me)— | —NH— | H | 2PO/4EO |
| 114 | Ni | 4 | H | -5-OC₆H₃(2-Me)— | —NH— | H | 3BO/3EO |
| 115 | Ni | 1 | H | -5-OC₆H₂(2,6-di-Me)— | —NH— | H | 3PO/6EO |
| 116 | Ni | 2 | tetra-Me | -5-OC₆H₂(2,6-di-Me)— | —NH— | H | 4PO/3EO |
| 117 | Ni | 1 | H | -3-OC₆H₃(4-OEt)— | —NH— | H | 3BO/10EO |
| 118 | Ni | 1 | H | -5-OC₆H₃(2-OEt)— | —NH— | H | 2PO/8EO |
| 119 | Ni | 2 | H | -5-OC₆H₃(2-OEt)— | —NH— | H | 4PO/3EO |
| 120 | Ni | 1 | tetra-OEt | -3-OC₆H₃(4-t-Bu)— | —NH— | Me | 2PO/10EO |

TABLE 4-continued

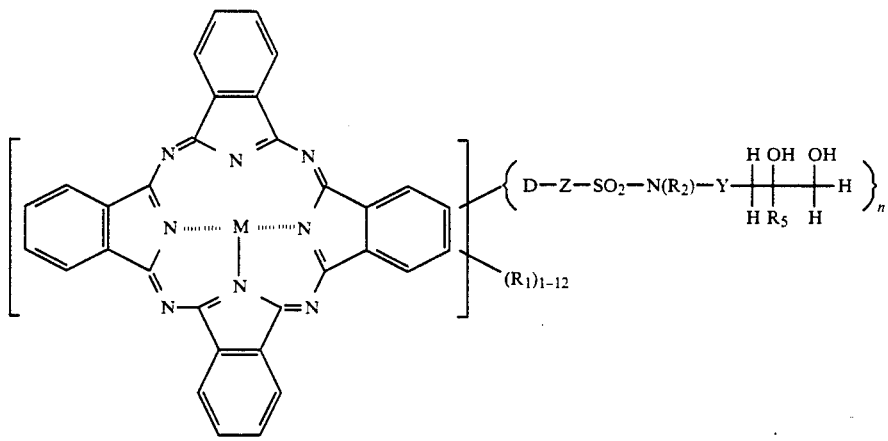

| Example | M | n | (R₁)₁₋₁₂ | —D—Z— | —N(R₂)— | R₅ | Y |
|---|---|---|---|---|---|---|---|
| 121 | Ni | 2 | H | -3-OC₆H₃(4-t-Bu)— | —NH— | Me | 4PO/3EO |
| 122 | Ni | 4 | H | -3-OC₆H₃(4-t-Bu)— | —NH— | Me | 2PO/7EO |
| 123 | Ni | 2 | di-OEt | -3-OC₆H₃(4-t-Bu)— | —NH— | Me | 4PO/3PO |
| 124 | Ni | 4 | H | -3-OC₆H₃(4-t-Bu)— | —NH— | Me | 3PO/5EO |
| 125 | Ni | 1 | H | -3-OC₆H₃(4-Cl)— | —NH— | H | 2PO/10EO |
| 126 | Ni | 2 | H | -3-OC₆H₃(4-Cl)— | —NH— | H | 4PO/3EO |
| 127 | Ni | 4 | H | -3-OC₆H₃(4-Br)— | —NH— | H | 2PO/7EO |
| 128 | Ni | 1 | tetra-Cl | -4-SC₆H₄— | —NH— | H | 6PO/3EO |
| 129 | Ni | 2 | H | -4-SC₆H₄— | —NH— | H | 6BO/6EO |
| 130 | Ni | 3 | H | -4-SC₆H₄— | —NH— | Me | 2PO/10EO |
| 131 | Ni | 4 | H | -4-SC₆H₄— | —NH— | Me | 2BO/3EO |
| 132 | Ni | 2 | H | -4-SC₆H₄— | —NH— | Me | 2PO/4EO |
| 133 | Ni | 4 | di-OEt | -4-SC₆H₄— | —NH— | H | 2PO/6EO |
| 134 | Ni | 1 | H | -3-SC₆H₃(4-Me)— | —NH— | H | 5PO/5EO |
| 135 | Ni | 2 | H | -3-SC₆H₃(4-Me)— | —NH— | H | 4PO/3EO |
| 136 | Ni | 3 | di-Cl | -3-SC₆H₃(4-Me)— | —NH— | H | 3BO/2EO |
| 137 | Ni | 4 | H | -3-SC₆H₃(4-Me)— | —NH— | H | 2PO/5EO |
| 138 | Ni | 2 | H | -3-SC₆H₃(4-Me)— | —NH— | Me | 2BO/4EO |
| 139 | Ni | 4 | tetra-Br | -3-SC₆H₃(4-Me)— | —NH— | Me | 3BO/2EO |
| 140 | Co | 1 | H | -4-OC₆H₄— | —NH— | Me | 2PO/7EO |
| 142 | Co | 2 | H | -4-OC₆H₄— | —NH— | Me | 6BO/6EO |
| 143 | Co | 3 | tetra-O-n-C₄H₉ | -4-OC₆H₄— | —NH— | Me | 2PO/10EO |
| 144 | Co | 4 | H | -4-OC₆H₄— | —NH— | Me | 2BO/3EO |
| 145 | Co | 2 | di-Br | -4-OC₆H₄— | —NH— | Me | 4PO/3EO |
| 146 | Co | 4 | tetra-Br | -4-OC₆H₄— | —NH— | Me | 2BO/4EO |
| 147 | Co | 1 | H | -3-OC₆H₃(4-OMe)— | —NH— | H | 2PO/14EO |
| 148 | Co | 2 | H | -3-OC₆H₃(4-OMe)— | —NH— | H | 4PO/3EO |
| 149 | Co | 4 | H | -3-OC₆H₃(4-OMe)— | —NH— | H | 2BO/6EO |
| 150 | Co | 1 | H | -3-OC₆H₃(2-OMe)— | —NH— | H | 5PO/3EO |
| 151 | Co | 2 | H | -5-OC₆H₃(2-OMe)— | —NH— | H | 2PO/10EO |
| 152 | Co | 4 | H | -5-OC₆H₃(2-OMe)— | —NH— | H | 2BO/3EO |
| 153 | Co | 1 | di-Cl | -3-OC₆H₃(4-Me)— | —NH— | H | 2PO/14EO |
| 154 | Co | 2 | H | -3-OC₆H₃(4-Me)— | —NH— | H | 4PO/3EO |
| 155 | Co | 3 | H | -3-OC₆H₃(4-Me)— | —NH— | H | 2PO/8EO |
| 156 | Co | 4 | H | -3-OC₆H₃(4-Me)— | —NH— | H | 2PO/7EO |
| 157 | Co | 2 | di-Et | -3-OC₆H₃(4-Me)— | —NH— | H | 2PO/4EO |
| 158 | Co | 4 | H | -3-OC₆H₃(4-Me)— | —NH— | H | 12 EO |
| 159 | Co | 1 | H | -5-OC₆H₃(2-Me)— | —NH— | H | 2BO/4EO |
| 160 | Co | 1 | H | -3-OC₆H₃(4-t-Bu)— | —NH— | H | 2PO/10EO |
| 161 | Co | 2 | H | -3-OC₆H₃(4-t-Bu)— | —NH— | H | 4PO/3EO |
| 162 | Co | 4 | tetra-Br | -3-OC₆H₃(4-t-Bu)— | —NH— | H | 2PO/7EO |
| 163 | Co | 2 | H | -3-OC₆H₃(4-t-Bu)— | —NH— | H | 4PO/3EO |
| 164 | Co | 4 | H | -3-OC₆H₃(4-t-Bu)— | —NH— | H | 3PO/5EO |
| 165 | Co | 1 | H | -4-SC₆H₄— | —NH— | H | 6PO/3EO |
| 166 | Co | 2 | di-OMe | -4-SC₆H₄— | —NH— | H | 6BO/6EO |
| 167 | Co | 3 | H | -4-SC₆H₄— | —NH— | H | 2PO/10EO |
| 168 | Co | 4 | H | -4-SC₆H₄— | —NH— | H | 2BO/3EO |
| 169 | Co | 3 | di-Cl | -4-SC₆H₄— | —NH— | H | 2PO/4EO |
| 170 | Co | 1 | H | -3-SC₆H₃(4-OMe)— | —NH— | H | 8PO/8EO |
| 171 | Co | 2 | H | -3-S—C₆H₃(4-OMe)— | —NH— | H | 4PO/3EO |
| 172 | Co | 4 | H | -3-SC₆H₃(4-OMe)— | —NH— | H | 2PO/7EO |
| 173 | Co | 1 | tri-Cl | -3-SC₆H₃(4-Me)— | —NH— | H | 5PO/5EO |
| 174 | Co | 2 | H | -3-SC₆H₃(4-Me)— | —NH— | H | 4PO/3EO |
| 175 | Co | 4 | H | -3-SC₆H₃(4-Me)— | —NH— | H | 2PO/5EO |
| 176 | Co | 2 | di-Br | -3-SC₆H₃(4-Me)— | —NH— | H | 2BO/4EO |
| 177 | Co | 4 | H | -3-SC₆H₃(4-Me)— | —NH— | H | 3BO/2EO |

TABLE 5

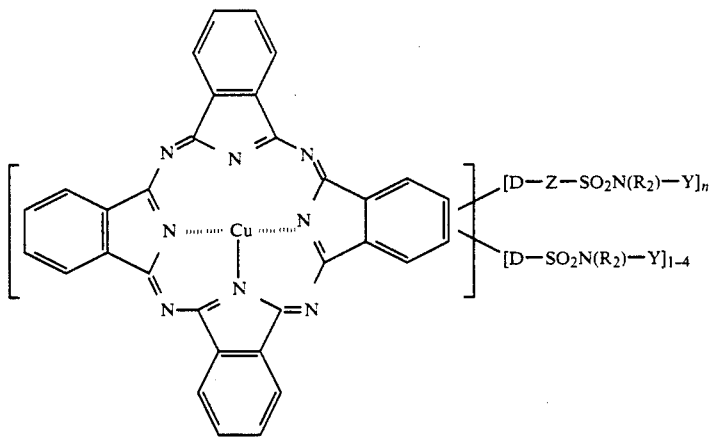

| Exam. | n | —[SO$_2$N(R$_2$)—Y]$_{1-4}$ | —D—Z— | —N(R$_2$) | Y |
|---|---|---|---|---|---|
| 1 | 4 | tetra-SO$_2$NH—4PO/3EO | 4-OC$_6$H$_4$— | —NH— | 4PO/3EO |
| 2 | 4 | tetra-SO$_2$N(CH$_3$)—2BO/6EO | 4-OC$_6$H$_4$— | —N(CH$_3$)— | 2BO/6EO |
| 3 | 4 | di-SO$_2$N(C$_6$H$_5$)—4PO/3EO | 4-SC$_6$H$_4$— | —N(C$_6$H$_5$)— | 2PO/14EO |
| 4 | 8 | tetra-SO$_2$(C$_6$H$_{11}$)—2PO/4EO | 3-OC$_6$H$_3$(4-OMe)— | —NH— | 2BO/6EO |
| 5 | 8 | mono-SO$_2$N(C$_2$H$_5$)—9PO/1EO | 4-OC$_6$H$_4$— | —N(C$_2$H$_5$)— | 4PO/3EO |
| 6 | 4 | tetra-SO$_2$N(Y)—6PO/6EO | 4-OC$_6$H$_4$— | —N(CH$_3$)— | 2BO/6EO |
| 7 | 4 | di-SO$_2$N(C$_6$H$_5$)—4PO/3EO | 5-OC$_6$H$_3$(2-OMe)— | —NH— | 2PO/10EO |
| 8 | 4 | tetra-SO$_2$NH—2PO/4EO | 3-OC$_6$H$_3$(4-OMe)— | —N(Y)— | 9PO/1EO |
| 9 | 8 | di-SO$_2$NH—4PO/3EO | 3-OC$_6$H$_3$(4-Cl)— | —NH— | 4PO/3EO |
| 10 | 4 | tetra-SO$_2$NH—2BO/6EO | 4-OC$_6$H$_4$— | —NH— | 2BO/6EO |
| 11 | 4 | tetra-SO$_2$NH—4PO/3EO | 3-SC$_6$H$_3$(4-OEt)— | —NH— | 4PO/3EO |
| 12 | 8 | tetra-SO$_2$NH—2BO/3EO | 3-C$_6$H$_3$(4-OMe)— | —NH— | 2BO/6EO |
| 13 | 8 | di-SO$_2$NH—9PO/1EO | 4-OC$_6$H$_4$— | —NH— | 5 PO |
| 14 | 4 | di-SO$_2$NH—6PO/8EO | 4-OC$_6$H$_4$— | —NH— | 2PO/10EO |
| 15 | 8 | di-SO$_2$NH—4PO/3EO | 5-OC$_6$H$_3$(2-OEt)— | —NH— | 2PO/14EO |
| 16 | 4 | di-SO$_2$NH—2PO/4EO | 3-OC$_6$H$_3$(4-OMe)— | —NH— | 8PO/2EO |

We claim:

1. A colorant having the formula A—[-D—Z—SO$_2$—N(R$_2$)—Y]$_n$,
   wherein A is non-ionic phthalocyanine chromophore of Cu, Ni or Al;
   n is 1-16;
   wherein R$_2$ is hydrogen, C1-C20 alkyl or cycloalkyl, phenyl, benzyl or Y;
   Z is an arylene moiety selected from benzene, naphthalene, anthracene, biphenyl, thiophene, benzothiazole, benzoxazole, furan, thiazole, thiadiazole and quinoline;
   D is a linking group selected from O, SO$_2$, S, N(R$_3$) and N(SO$_2$R$_4$), where R$_4$ is C1-C20 alkyl or cycloalkyl, and R$_3$ is hydrogen or R$_4$;
   Y is a poly(oxyalkylene) moiety comprising at least three monomeric units selected from the formula (—RO—), wherein each R is an alkylene of 2-4 carbons, and Y is terminated with a group selected from hydrogen, C1-C20 alkyl, C1-C20 cycloalkyl, phenyl, and groups having the formula:

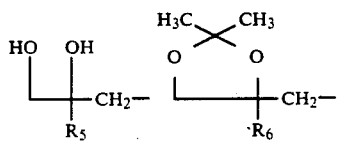

where R$_5$ and R$_6$ are selected from hydrogen, methyl and ethyl.

2. The colorant of claim 1 where n is 1-4.

3. The colorant of claim 2 wherein Y has an average molecular weight of from 200 to 1500.

4. The colorant of claim 3 wherein R$_2$ is selected from hydrogen, and C1-C6 alkyl or cycloalkyl.

5. The colorant of claim 4 wherein A is phthalocyanine chromophore of Cu.

6. The colorant of claim 1 wherein Y has an average molecular weight of from 200 to 1500, and Y is terminated with a group selected from hydrogen, C1-C4 alkyl or a group having the formula:

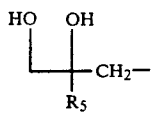

wherein R$_5$ is selected from hydrogen, methyl and ethyl.

7. The colorant of claim 6 wherein R$_2$ is hydrogen and A is phthalocyanine chromophore of Cu.

8. The colorant of claim 7 wherein D is O and Z is a benzene moiety.

9. The colorant of claim 7 wherein n is 1-4.

10. The colorant of claim 2 wherein D is selected from O and S.

11. The colorant of claim 10 wherein Z is a benzene moiety.

12. The colorant of claim 11 wherein R$_2$ is hydrogen.

13. A colorant having the formula A—[-D—Z—SO$_2$—N(R$_2$)—Y]$_n$,
   wherein A is non-ionic phthalocyanine chromophore of Cu, Ni or Al;

n is 1-16;

wherein $R_2$ is hydrogen, C1-C20 alkyl or cycloalkyl, phenyl, benzyl or Y;

Z is an arylene moiety selected from benzene, naphthalene, anthracene, biphenyl, thiophene, benzothiazole, benzoxazole, furan, thiazole, thiadiazole and quinoline;

D is a linking group selected from O, $SO_2$, S, $N(R_3)$ and $N(SO_2R_4)$, where $R_4$ is C1-C20 alkyl or cycloalkyl, and $R_3$ is hydrogen or $R_4$;

Y is a poly(oxyalkylene) moiety comprising at least three monomeric units selected from the formula (—RO—), wherein each R is an alkylene of 2-4 carbons, and Y is terminated with a group selected from hydrogen, C1-C20 alkyl, C1-C20 cycloalkyl, C1-C20 acyl, phenyl, and groups having the formula:

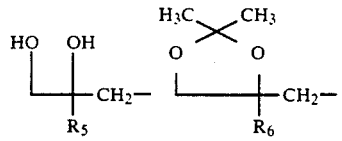

where $R_5$ and $R_6$ are selected from hydrogen, methyl and ethyl.

* * * * *